(12) United States Patent
Mohamad Alizadeh Shabestary et al.

(10) Patent No.: US 11,783,702 B2
(45) Date of Patent: Oct. 10, 2023

(54) METHOD AND SYSTEM FOR ADAPTIVE CYCLE-LEVEL TRAFFIC SIGNAL CONTROL

(71) Applicant: HUAWEI CLOUD COMPUTING TECHNOLOGIES CO., LTD., Gui'an New District (CN)

(72) Inventors: Soheil Mohamad Alizadeh Shabestary, Toronto (CA); Baher Abdulhai, Mississauga (CA); Hao Hai Ma, Kleinburg (CA); Yi Huo, HangZhou (CN)

(73) Assignee: HUAWEI CLOUD COMPUTING TECHNOLOGIES CO., LTD, Gui'an New District (CN)

( * ) Notice: Subject to any disclaimer, the term of this patent is extended or adjusted under 35 U.S.C. 154(b) by 121 days.

(21) Appl. No.: 17/327,523

(22) Filed: May 21, 2021

(65) Prior Publication Data

US 2022/0092973 A1 Mar. 24, 2022

Related U.S. Application Data

(60) Provisional application No. 63/080,455, filed on Sep. 18, 2020.

(51) Int. Cl.
*G08G 1/07* (2006.01)
*G08G 1/01* (2006.01)
(Continued)

(52) U.S. Cl.
CPC .............. *G08G 1/07* (2013.01); *G06N 20/00* (2019.01); *G08G 1/012* (2013.01); *G08G 1/052* (2013.01)

(58) Field of Classification Search
CPC .......... G08G 1/07; G08G 1/012; G08G 1/052; G08G 1/0145; G08G 1/095; G08G 1/01; G06N 20/00
See application file for complete search history.

(56) References Cited

U.S. PATENT DOCUMENTS

| 5,357,436 A * | 10/1994 | Chiu | G08G 1/07 340/916 |
| 2013/0176146 A1* | 7/2013 | Dusparic | G08G 1/07 340/907 |
| 2015/0102945 A1* | 4/2015 | El-Tantawy | G08G 1/081 340/909 |

FOREIGN PATENT DOCUMENTS

| CN | 110164150 A | 8/2019 |
| CN | 110428615 A | 11/2019 |

(Continued)

OTHER PUBLICATIONS

B. Abdulhai and L. Kattan, "Reinforcement learning: Introduction to theory and potential for transport applications," Can. J. Civ. Eng., vol. 30, No. 6, pp. 981-991, Dec. 2003.

(Continued)

*Primary Examiner* — Sisay Yacob

(57) ABSTRACT

Methods, systems, and processor-readable media for adaptive cycle-level traffic signal control are described. An adaptive cycle-level traffic signal controller and control method that operate within a continuous action space. A reinforcement learning algorithm called Proximal Policy Optimization (PPO), which is a type of actor-critic model for reinforcement learning, may be used to generate signal cycle phase durations selected from a continuous range of values. The controller thus does not treat the action space as discrete, but instead produces continuous values as output. The generated phase durations may define a full traffic signal cycle. The inputs to the controller may indicate current and (Continued)

past states of the traffic environment. The average duration of delay of vehicles in the traffic environment may be used to calculate the reward for the reinforcement learning model that drives the behavior of the controller.

20 Claims, 11 Drawing Sheets

(51) Int. Cl.
  *G08G 1/052* (2006.01)
  *G06N 20/00* (2019.01)

(56) References Cited

FOREIGN PATENT DOCUMENTS

| CN | 111243297 | A | 6/2020 |
|---|---|---|---|
| KR | 102155055 | B1 | 9/2020 |
| WO | 2013086629 | A1 | 6/2013 |

OTHER PUBLICATIONS

B. Abdulhai, R. Pringle, and G. J. Karakoulas, "Reinforcement Learning for True Adaptive Traffic Signal Control," J. Transp. Eng., vol. 129, No. 3, pp. 278-285, 2003.

A. L. C. Bazzan, "Opportunities for multiagent systems and multiagent reinforcement learning in traffic control," Auton. Agent. Multi. Agent. Syst., vol. 18, No. 3, pp. 342-375, 2008.

B. Chen and H. H. Cheng, "A review of the applications of agent technology in traffic and transportation systems," IEEE Trans. Intell. Transp. Syst., vol. 11, No. 2, pp. 485-497, 2010.

S. El-Tantawy, B. Abdulhai, and H. Abdelgawad, "Multiagent Reinforcement Learning for Integrated Network of Adaptive Traffic Signal Controllers (MARLIN-ATSC): Methodology and Large-Scale Application on Downtown Toronto," IEEE Trans. Intell. Transp. Syst., vol. 14, No. 3, pp. 1140-1150, 2013.

W. Genders and S. Razavi, "Using a Deep Reinforcement Learning Agent for Traffic Signal Control," CoRR, vol. abs/1611.0, 2016.

J. Gao, Y. Shen, J. Liu, M. Ito, and N. Shiratori, "Adaptive Traffic Signal Control: Deep Reinforcement Learning Algorithm with Experience Replay and Target Network," CoRR, vol. abs/1705.0, 2017.

Y. Gong, M. Abdel-Aty, Q. Cai, and M. S. Rahman, "A decentralized network level adaptive signal control algorithm by deep reinforcement learning," 2019.

S. M. A. Shabestary and B. Abdulhai, "Deep Learning vs. Discrete Reinforcement Learning for Adaptive Traffic Signal Control," in 2018 21st International Conference on Intelligent Transportation Systems (ITSC), 2018, pp. 286-293.

S. M. A. Shabestray and B. Abdulhai, "Multimodal iNtelligent Deep (MiND) Traffic Signal Controller," in 2019 IEEE Intelligent Transportation Systems Conference (ITSC), 2019, pp. 4532-4539.

D. P. Kingma and J. Ba, "Adam: A method for stochastic optimization," arXiv Prepr. arXiv1412.6980, 2014.

M. Aslani, M. S. Mesgari, and M. Wiering, "Adaptive traffic signal control with actor-critic methods in a real-world traffic network with different traffic disruption events," Transp. Res. Part C Emerg. Technol., vol. 85, pp. 732-752, 2017.

X. Liang, X. Du, G. Wang, and Z. Han, "A Deep Reinforcement Learning Network for Traffic Light Cycle Control," IEEE Trans. Veh. Technol., vol. 68, No. 2, pp. 1243-1253, 2019.

D. Krajzewicz, J. Erdmann, M. Behrisch, and L. Bieker, "Recent Development and Applications of {SUMO—Simulation of Urban Mobility}," Int. J. Adv. Syst. Meas., vol. 5, No. 384, pp. 128-138, Dec. 2012.

J. C. Spall, "An overview of the simultaneous perturbation method for efficient optimization," Johns Hopkins apl Tech. Dig., vol. 19, No. 4, pp. 482-492, 1998.

Soheil Mohamad Alizadeh Shabestary et al.,"Deep Learning vs. Discrete Reinforcement Learning for Adaptive Traffic Signal Control",2018 21st International Conference on Intelligent Transportation Systems (ITSC),Maui, Hawaii, USA, Nov. 4-7, 2018,total 8 pages.

Rusheng Zhang et al.,"Partially Detected Intelligent Traffic Signal Control: Environmental Adaptation", arXiv:1910.10808v1 [eess. SP] Oct. 23, 2019,total 5 pages.

* cited by examiner

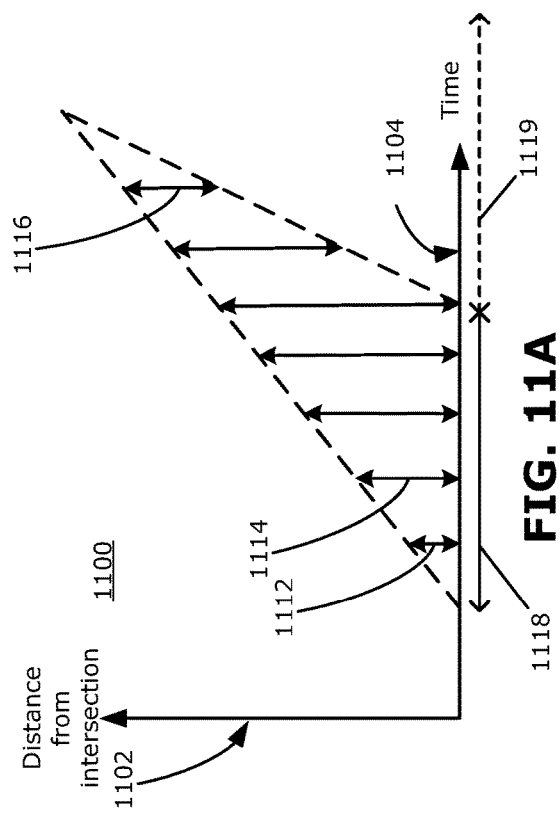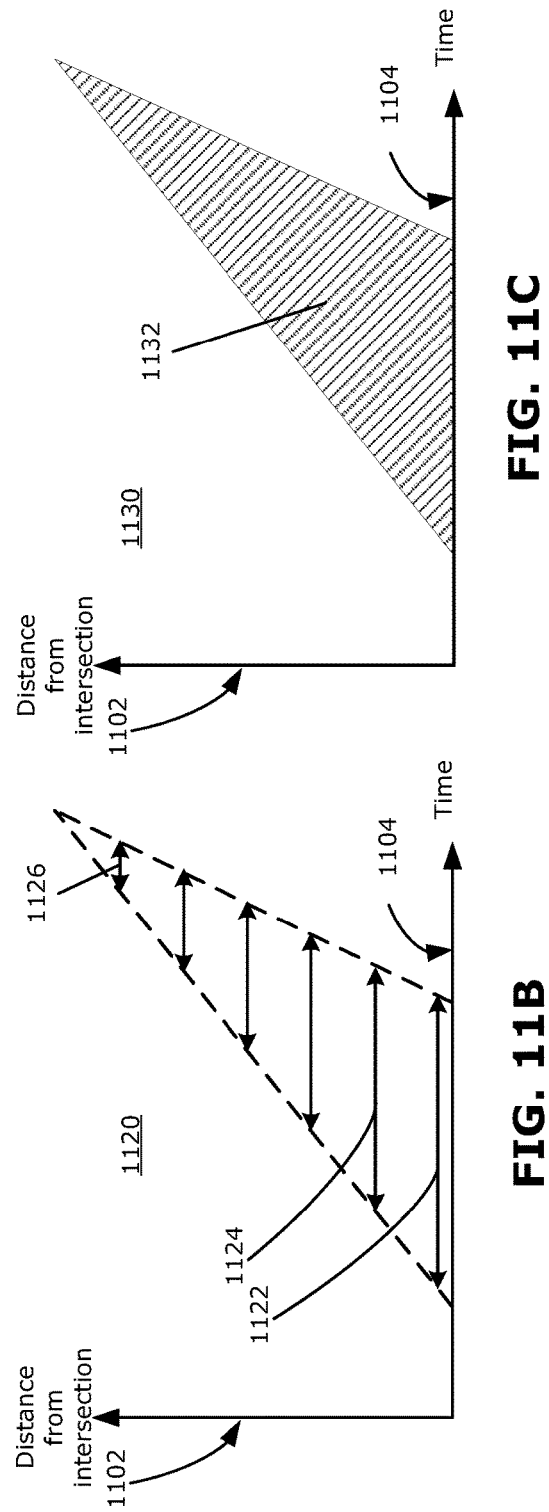

METHOD AND SYSTEM FOR ADAPTIVE CYCLE-LEVEL TRAFFIC SIGNAL CONTROL

RELATED APPLICATION DATA

The present application claims priority to U.S. provisional patent application No. 63/080,455 filed Sep. 18, 2020, the entire contents of which are incorporated herein by reference.

FIELD

The present application generally relates methods and systems for traffic signal control, and in particular to adaptive cycle-level traffic signal control.

BACKGROUND

Traffic congestion is responsible for a significant amount of wasted time, wasted fuel, and pollution. Constructing new infrastructure to offset these issues is often not practical due to monetary and space limitations as well as environmental and sustainability concerns. Therefore, in order to increase the capacity of urban transportation networks, researchers have explored the use of technology that maximizes the performance of existing infrastructure. Optimizing the operation of traffic signals has shown promise in decreasing the delays of drivers in urban networks.

A traffic signal is used to communicate traffic rules to drivers of vehicles operating within a traffic environment. A typical traffic signal controller controls a traffic signal managing vehicular traffic at a traffic environment consisting of a single intersection in a traffic network. Thus, for example, a single traffic signal controller may control a traffic signal consisting of red/amber/green traffic lights facing in four directions (North, South, East, and West), although it will be appreciated that some traffic signals may control traffic in environments consisting of more or fewer than four directions of traffic and may include other signal types, e.g., different signals for different lanes facing the same direction, turn arrows, street-based mass transit signals, etc.

A traffic signal typically operates in cycles, each cycle consisting of several phases. A single phase may correspond to a fixed state for the various lights of the traffic signal, for example, green lights facing North and South and red lights facing East and West, or amber lights facing North and South and red lights facing East and West, although some phases may include additional, non-fixed states such as counters counting down for pedestrian crossings. Typically, a traffic signal cycle consists of each phase in the cycle repeated once, typically in a fixed order.

FIG. 1 shows an example traffic signal cycle 100 consisting of eight phases in order from a first phase 102 through an eighth phase 116. In this example, all other lights are red during a phase unless otherwise indicated.

During the first phase 102, Phase 1, the traffic signal displays green left-turn arrows to northbound traffic (i.e. on a south-facing light post), indicated as "NL", and southbound traffic (i.e. on a north-facing light post), indicated as "SL". During a second phase 104, Phase 2, the traffic signal displays a green left-turn arrow and a green "through" light or arrow to southbound traffic, indicated as "SL" and "ST" respectively. During a third phase 106, Phase 3, the traffic signal displays a green left-turn arrow and a green "through" light or arrow to northbound traffic, indicated as "NL" and "NT" respectively. During a fourth phase 108, Phase 4, the traffic signal displays an amber left-turn arrow (shown as a broken line) and a green "through" light or arrow to both northbound and southbound traffic. During a fifth phase 110, Phase 5, the traffic signal displays green left-turn arrows to eastbound traffic (i.e. on a west-facing light post), indicated as "EL", and westbound traffic (i.e. on an east-facing light post), indicated as "WL". During a sixth phase 112, Phase 6, the traffic signal displays a green left-turn arrow and a green "through" light or arrow to westbound traffic, indicated as "WL" and "WT" respectively. During a seventh phase 114, Phase 7, the traffic signal displays a green left-turn arrow and a green "through" light or arrow to eastbound traffic, indicated as "EL" and "ET" respectively. During the eighth phase 116, Phase 8, the traffic signal displays an amber left-turn arrow (shown as a broken line) and a green "through" light or arrow to both westbound and eastbound traffic.

After completing Phase 8 116, the traffic signal returns to Phase 1 102. Traffic signal controller optimization typically involves optimizing the duration of each phase of the traffic signal cycle to achieve traffic objectives.

The most common approaches for traffic signal control are fixed-time and actuated. In a fixed-time traffic signal controller configuration, each phase of the traffic signal cycle has a fixed duration. Fixed-time controllers use historical traffic data to determine optimal traffic signal patterns; the optimized fixed-time signal patterns (i.e. the set of phase durations for the cycle) are then deployed to control real-life traffic signals, after which time the patterns are fixed and do not change.

In contrast to fixed-time controllers, actuated signal controllers receive feedback from sensors in order to respond to traffic flows; however, they do not explicitly optimize delay, instead typically adjusting signal patterns in response to immediate traffic conditions without adapting to traffic flows over time. Thus, the duration of a phase may be lengthened based on current traffic conditions based on sensor data, but there is no mechanism for using data from past phases or cycles to optimize the traffic signal operation over time, or to base decisions on optimizing a performance metric such as average or aggregate vehicle delay.

Adaptive traffic signal controllers (ATSC) are more advanced and can outperform other controllers, such as fixed-time or actuated controllers. ATSC constantly modify signal timings to optimize a predetermined objective or performance metric. Some ATSCs, including SCOOT, SCATS, PRODYN, OPAC, UTOPIA, and RHODES, optimize the signal using an internal model of a traffic environment that is often simplistic and rarely up-to-date with current conditions. Their optimization algorithms are mostly heuristic and sub-optimal. Due to the stochastic nature of traffic and driver behavior, it is difficult to devise a precise traffic model. The models that are more realistic are also more sophisticated and harder to control, sometimes resulting in computational delays that are too long to enable real-time traffic control. Hence, there is a trade-off between the complexity and practicality of the controller.

There have, however, been some improvements in this area, with the advent of Reinforcement Learning (RL), which is a model-free closed-loop control method used for optimization. RL algorithms can learn an optimal control strategy while interacting with the environment and evaluating their own performance. More recently, researchers have used Deep Reinforcement Learning (DRL) employing Convolutional Neural Networks in an ATSC. Examples of DRL traffic signal control systems are described in W. Genders and S. Razavi, "Using a Deep Reinforcement Learning Agent for Traffic Signal Control," CoRR, vol. abs/1611.0, 2016; J. Gao, Y. Shen, J. Liu, M. Ito, and N. Shiratori, "Adaptive Traffic Signal Control: Deep Reinforcement Learning Algorithm with Experience Replay and Target Network," CoRR, vol. abs/1705.0, 2017; and S. M. A. Shabestary and B. Abdulhai, "Deep Learning vs. Discrete Reinforcement Learning for Adaptive Traffic Signal Control," in 2018 21st International Conference on Intelligent Transportation Systems (ITSC), 2018, pp. 286-293, all of which are hereby incorporated by reference in their entirety.

Deep Reinforcement Learning is capable of processing large state space problems and achieving better performance compared to other RL approaches using function approximation methods. In some DRL ATSCs, the surface of the street is discretized into small cells, the cells are grouped together to create a matrix of positions and speeds of vehicles approaching the intersection, and the matrix is used as the input to a Deep Q-Network that performs the DRL task.

Existing DRL controllers are designed to take action every second, in what is referred to as second-based control. At each second, the DRL decides either to extend the current green signal or to switch to another phase. These controllers require reliable high frequency communication infrastructure and powerful computational units in order to effectively monitor the traffic environment and control the traffic signal on a per-second time scale. In addition, because the behavior of the controller cannot be known more than one second in advance, some municipalities and traffic authorities are not comfortable with controllers that make decisions every second. Instead, they prefer to know what each phase of the next cycle will look like in advance, as is possible using fixed-time controllers. Furthermore, the possibility of a green signal being terminating at any second may also conflict with safe pedestrian crossing, as it may be difficult or impossible to configure pedestrian countdown timers to enable safe passage across a pedestrian crossing for pedestrians who have already entered the crossing.

For these reasons, a traffic signal controller that is able to make decisions with a lower frequency than once a second may present certain advantages. It may be possible to implement a traffic signal controller that generates decision data for an entire cycle, which may be referred to as cycle-based control. A cycle-based controller may produce duration data for all the phases of the next traffic signal cycle. By limiting the interaction of the controller with the traffic signal, however, this approach may decrease the flexibility of the controller to react to changes in the traffic environment in real time. The literature on cycle-based RL-based traffic signal control is limited, at least in part because of the complicated and enormous action space. In a second-based control approach with a fixed order of phases in each cycle, the controller has to decide either to extend the current green phase or to switch to next phase, which leads to a discrete action space of size two (0=extend, 1=switch). At most, a second-based controller with flexible ordering of phases within each cycle not only has to decide whether to switch (extend or switch=2 actions), but also has to decide which of the possible phases to switch to (n phases in a cycle=n actions), in which case the actions space size is a discrete set of n (n possible phases at each intersection, which in most cases is limited to a maximum number of 8 phases, n=8).

On the other hand, cycle-based controllers must contend with a continuous action space. The traffic signal cycle, and each phase thereof, can be of any length of time. Even if time is discretized, the action space increases drastically compared to the second-based control problem. In a first example, the cycle of a traffic signal at an intersection has 4 phases (e.g., North & South, North-left-turn & South-left-turn, East & West, and East-left-turn & West-left-turn). Assuming that all phases have a minimum green time of 10 second and maximum green time of 30 seconds, the action space is the number of second duration values that can be chosen for the current phase (i.e. 20), raised to the power of the number of phases to switch to (i.e. 4), i.e. $20^4$=160,000.

This problem is discussed in M. Aslani, M. S. Mesgari, and M. Wiering, "Adaptive traffic signal control with actor-critic methods in a real-world traffic network with different traffic disruption events," Transp. Res. Part C Emerg. Technol., vol. 85, pp. 732-752, 2017 (hereinafter "Aslani"), which is hereby incorporated by reference in its entirety. Aslani addresses this problem by discretizing the action space into 10-second intervals. So the controller for each phase has to choose a phase duration from the set [0 seconds, 10 seconds, 20 seconds . . . 90 seconds], which is a very coarse discretization that may affect the performance of the controller.

Another approach is described in X. Liang, X. Du, G. Wang, and Z. Han, "A Deep Reinforcement Learning Network for Traffic Light Cycle Control," IEEE Trans. Veh. Technol., vol. 68, no. 2, pp. 1243-1253, 2019, hereby incorporated by reference in its entirety, which uses an incremental approach to setting the signal timing. The controller does not define the phase durations directly, but it decides to increase or decrease the timing of each phase by 5 seconds at each decision point. This approach not only suffers from coarse discretization of the action space, but also it does not have the flexibility to react to sudden changes.

There is therefore a need for an adaptive traffic signal controller that can prospectively generate one or more phase durations for a traffic signal cycle over a continuous range of duration values and may thereby overcome one or more of the limitations of existing approaches identified above.

SUMMARY

The present disclosure describes methods, systems, and processor-readable media for adaptive cycle-level traffic signal control. An intelligent adaptive cycle-level traffic signal controller and control method are described that operate within a continuous action space. As described above, most existing adaptive traffic signal controllers work on a second-by-second basis, which has the disadvantages described above in relation to safety, predictability, and communication and computation requirements. Existing adaptive cycle-level traffic signal controllers are either model-based, offline, or preliminary. Embodiments described herein may include a continuous-action adaptive cycle-level traffic signal controller or control method using one a reinforcement learning algorithm called Proximal Policy Optimization (PPO), which is a type of actor-critic model for reinforcement learning. In some embodiments, the controller does not treat the action space as discrete, but instead produces continuous values as output, rendering established RL approaches such as deep Q networks (DQN) unusable. In some embodiments, for an intersection with 4 phases in the traffic signal cycle, the controller produces 4 continuous numbers, each indicating the duration of a phase of the cycle.

In some aspects, the present disclosure describes a method for training a reinforcement learning model to generate traffic signal cycle data. A training data sample indicating an initial state of a traffic environment affected by a traffic signal is processed by performing a number of operations. The reinforcement learning model is used to generate traffic signal cycle data by applying a policy to the training data sample and one or more past training data samples. The traffic signal cycle data comprises one or more phase durations of one or more respective phases of a traffic signal cycle. Each phase duration is a value selected from a continuous range of values. An updated state of the traffic environment following application of the generated traffic signal cycle data to the traffic signal is determined. A reward is generated by applying a reward function to the initial state of the traffic environment and the updated state of the traffic environment. The policy is adjusted based on the reward. The step of processing a training data sample is repeated one or more times. The training data sample indicates the updated state of the traffic environment.

In some aspects, the present disclosure describes a method system for training a reinforcement learning model to generate traffic signal cycle data. The system comprises a processor device and a memory. The memory stores thereon the reinforcement learning model, and machine-executable instructions which, when executed by the processing device, cause the system to process a training data sample indicating an initial state of a traffic environment affected by a traffic signal by performing a number of operations. A training data sample indicating an initial state of a traffic environment affected by a traffic signal is processed by performing a number of operations. The reinforcement learning model is used to generate traffic signal cycle data by applying a policy to the training data sample and one or more past training data samples. The traffic signal cycle data comprises one or more phase durations of one or more respective phases of a traffic signal cycle. Each phase duration is a value selected from a continuous range of values. An updated state of the traffic environment following application of the generated traffic signal cycle data to the traffic signal is determined. A reward is generated by applying a reward function to the initial state of the traffic environment and the updated state of the traffic environment. The policy is adjusted based on the reward. The step of processing a training data sample is repeated one or more times. The training data sample indicates the updated state of the traffic environment.

In some examples, the traffic environment is a simulated traffic environment, and the traffic signal is a simulated traffic signal.

In some examples, the one or more phase durations comprises phase durations for each phase of at least one cycle of the traffic signal.

In some examples, the one or more phase durations consists of a phase duration for one phase of a cycle of the traffic signal.

In some examples, the reinforcement learning model is an actor-critic model, the policy is an actor policy, and the reward function is a critic reward function.

In some examples, the actor-critic model is a proximal policy optimization (PPO) model.

In some examples, each training data sample comprises traffic data, including location data and velocity data for each of a plurality of vehicles in the traffic environment.

In some examples, each training data sample comprises traffic data, including traffic density data and traffic velocity data for each of a plurality of regions of the traffic environment.

In some examples, determining an updated state of the traffic environment comprises determining a length of each of one or more queues of stationary vehicles in the traffic environment. The length indicates a number of stationary cars in the queue. The one or more past training data samples comprises one or more past training data samples corresponding to one or more queue peak times (each queue peak time being a time at which the length of one of the queues was at a local maximum), and one or more past training data samples corresponding to one or more queue trough times (each queue trough time being a time at which a length of one of the queues was at a local minimum).

In some examples, the one or more past training data samples correspond to one or more phase transition times. Each phase transition time is a time at which the traffic signal transitions between two phases of the traffic signal cycle.

In some examples, the reward function is applied to the initial state of the traffic environment and the updated state of the traffic environment to calculate the reward based on an estimated number of stationary vehicles in the traffic environment over a previous traffic signal cycle.

In some examples, the one or more past training data samples correspond to one or more phase transition times. Each phase transition time is a time at which the traffic signal transitions between two phases of the traffic signal cycle.

In some examples, each training data sample comprises traffic signal phase data indicating the current phase of the traffic signal cycle, and an elapsed time during the current phase.

In some examples, the one or more phase durations comprises phase durations for each phase of at least one cycle of the traffic signal. The reinforcement learning model is a proximal policy optimization (PPO) actor-critic model. The policy is an actor policy. The reward function is a critic reward function. Each training data sample comprises: traffic signal phase data and traffic data. The traffic signal phase data indicates the current phase of the traffic signal cycle, and an elapsed time during the current phase. The traffic data includes traffic density data and traffic velocity data for each of a plurality of regions of the traffic environment. The reward function is applied to the initial state of the traffic environment and the updated state of the traffic environment to calculate the reward based on an estimated number of stationary vehicles in the traffic environment over a previous traffic signal cycle. The one or more past training data samples correspond to one or more phase transition times. Each phase transition time is a time at which the traffic signal transitions between two phases of the traffic signal cycle.

In some aspects, the present disclosure describes a system for generating traffic signal cycle data. The system comprises a processor device and a memory. The memory stores thereon a trained reinforcement learning model trained in accordance with the method steps described above, and machine-executable instructions which, when executed by the processing device, cause the system to perform a number of operations. Traffic environment state data indicating a state of a real traffic environment is received from a traffic monitoring system. The traffic environment used to train the reinforcement learning model is the real traffic environment or a simulated version thereof. The reinforcement learning model is used to generate traffic signal cycle data by applying the policy to at least the traffic environment state data. The traffic signal cycle data is sent to a traffic control system.

In some aspects, the present disclosure describes a non-transitory processor-readable medium having stored thereon a trained reinforcement learning model trained in accordance with the method steps described above.

In some aspects, the present disclosure describes a non-transitory processor-readable medium having machine-executable instructions stored thereon which, when executed by a processor device, cause the processor device to perform the method steps described above.

BRIEF DESCRIPTION OF THE DRAWINGS

Reference will now be made, by way of example, to the accompanying drawings which show example embodiments of the present application, and in which:

FIG. 11A is a graph of stationary vehicle distance from the intersection over time, showing total delay calculated as the sum of stationary vehicle queue lengths in accordance with embodiments described herein.

FIG. 11B is a graph of stationary vehicle distance from the intersection over time, showing total delay calculated as the sum of durations of stationary periods per vehicle or cell in accordance with embodiments described herein.

FIG. 11C is a graph of stationary vehicle distance from the intersection over time, showing total delay calculated as the area of the triangle defined by stationary vehicle queues over time in accordance with embodiments described herein.

Similar reference numerals may have been used in different figures to denote similar components.

DESCRIPTION OF EXAMPLE EMBODIMENTS

In various examples, the present disclosure describes methods, systems, and processor-readable media for adaptive cycle-level traffic signal control in a continuous action space. Various embodiment are described below with reference to the drawings. The description of the example embodiments is broken into multiple sections. The Example Controller Devices section describes example devices or computing systems suitable for implementing example traffic signal controllers and methods. The Example Reinforcement Learning Models section describes how the controller learns and updates the parameters of the RL model. The Examples of Traffic Signal Cycle Data section describes the actions space and outputs of the controller. The Examples of Traffic Environment State Data section describes the state space and inputs of the controller. The Example Reward Functions section describes the reward function of the controller. The Example Systems for Controlling Traffic Signals section describes the operation of the trained controller when it is used to control traffic signals in a real traffic environment.

Example Controller Devices

Figure 2:
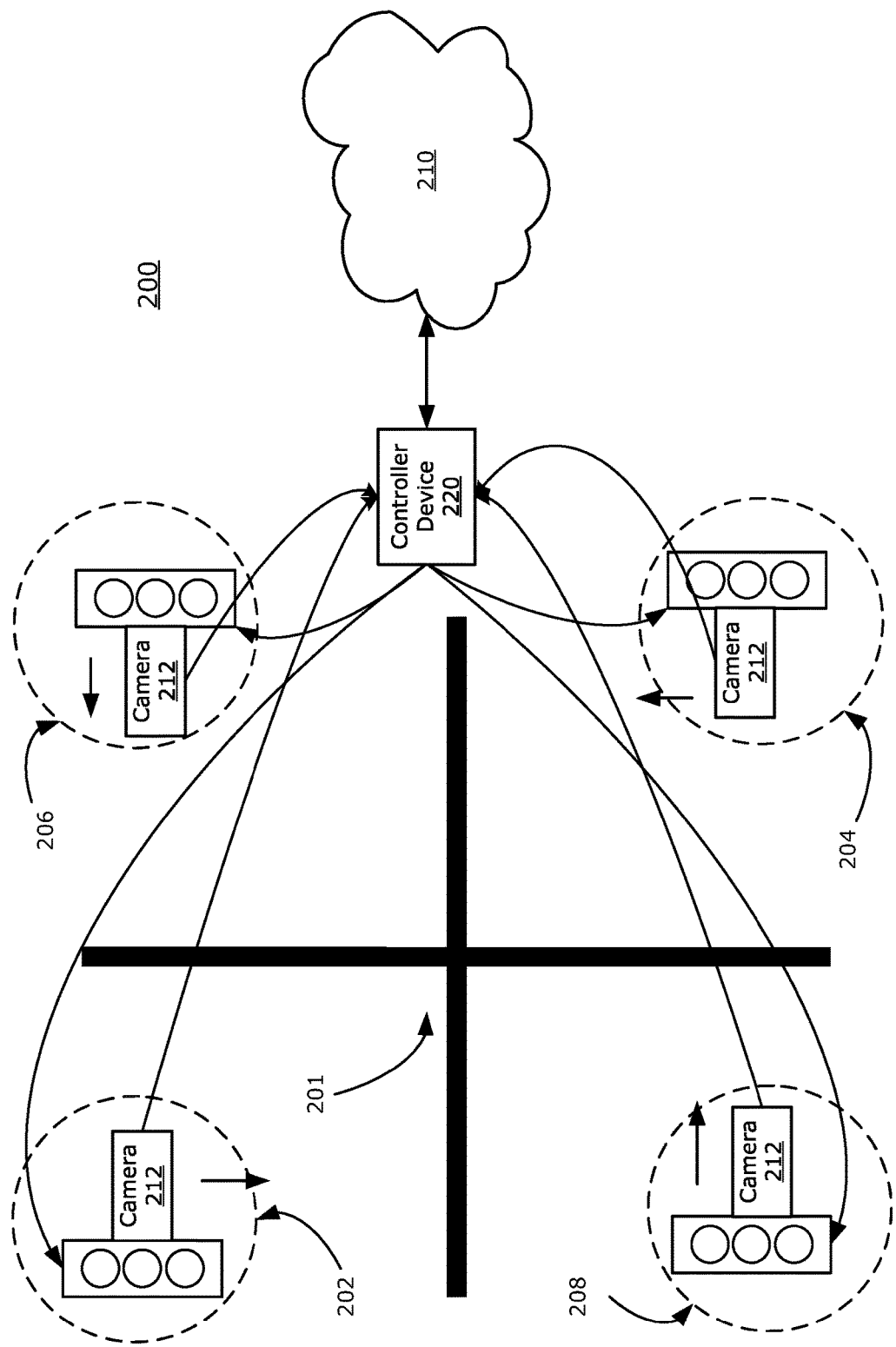
FIG. 2 is a block diagram showing an example traffic environment at an intersection, including a traffic signal and sensors, in communication with a traffic signal controller in accordance with embodiments described herein.

FIG. 2 is a block diagram showing an example traffic environment 200 at an intersection 201, including a traffic signal and sensors, in communication with an example traffic signal controller 220. The traffic signal is shown as four traffic lights: a south-facing light 202, a north-facing light 204, an east-facing light 206, and a west-facing light 208. Each traffic light 202, 204, 206, 208 includes a sensor shown as a long-range camera 212 facing the same direction as the light. (In all drawings showing top-down views of traffic environments, North corresponds to the top of the page.) The controller device 220 sends control signals to the four traffic lights 202, 204, 206, 208 and receives sensor data from the four cameras 212. The controller device 220 is also in communication with a network 210, through which it may communicate with one or more servers or other devices, as described in greater detail below.

It will be appreciated that, whereas embodiments are described herein with reference to a traffic environment consisting of a single intersection managed by a single signal (e.g., a single set of traffic lights), in some embodiments the traffic environment may encompass multiple nodes or intersections within a transportation grid and may control multiple traffic signals.

Figure 3:
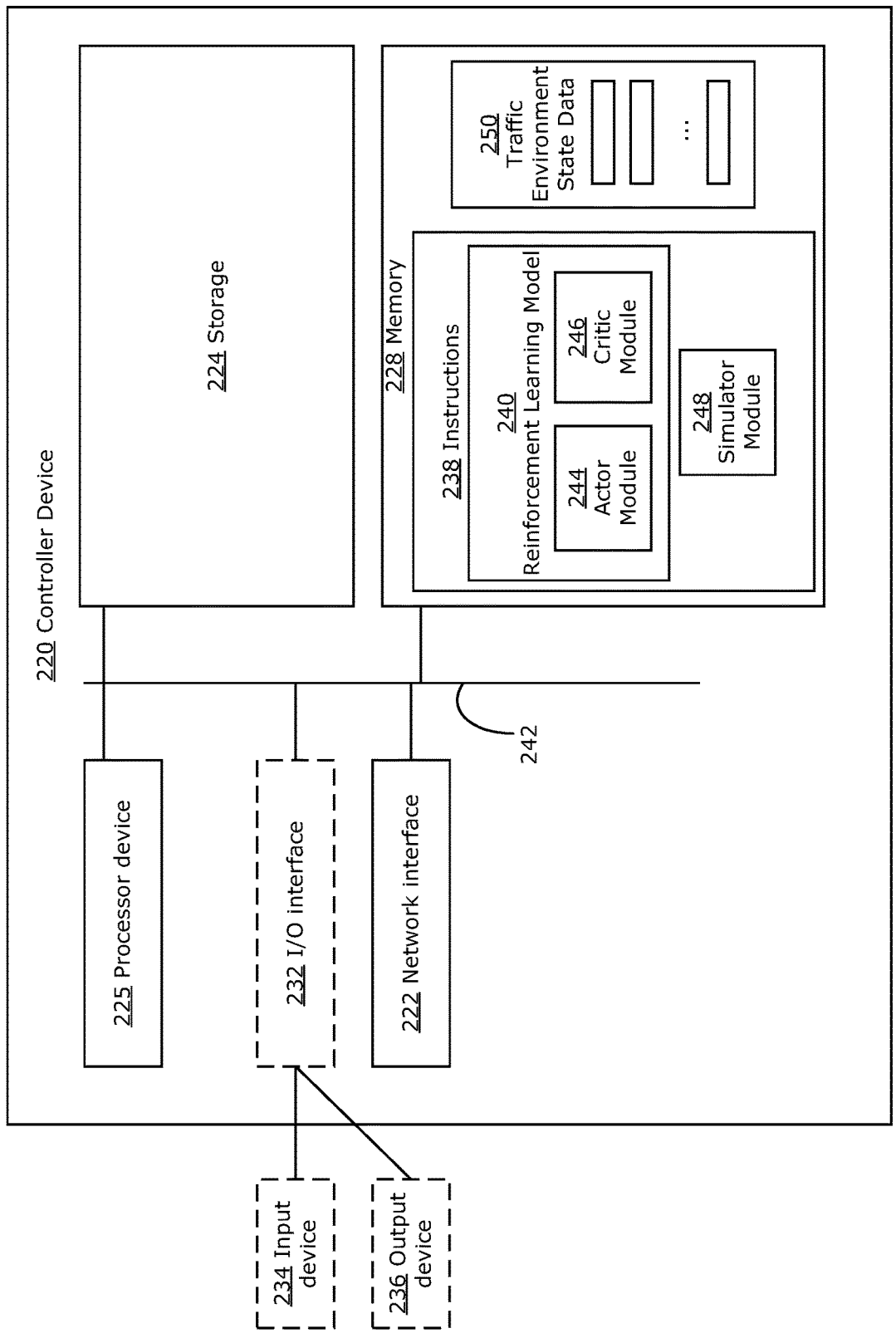
FIG. 3 is a block diagram of an example traffic signal controller in accordance with embodiments described herein.

FIG. 3 is a block diagram illustrating a simplified example of a controller device 220, such as a computer or a cloud computing platform, suitable for carrying out examples described herein. Other examples suitable for implementing embodiments described in the present disclosure may be used, which may include components different from those discussed below. Although FIG. 3 shows a single instance of each component, there may be multiple instances of each component in the controller device 220.

The controller device 220 may include one or more processor devices 225, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The controller device 220 may also include one or more optional input/output (I/O) interfaces 232, which may enable interfacing with one or more optional input devices 234 and/or optional output devices 236.

In the example shown, the input device(s) 234 (e.g., a maintenance console, a keyboard, a mouse, a microphone, a touchscreen, and/or a keypad) and output device(s) 236 (e.g., a maintenance console, a display, a speaker and/or a printer) are shown as optional and external to the controller device 220. In other examples, there may not be any input device(s) 234 and output device(s) 236, in which case the I/O interface(s) 232 may not be needed.

The controller device 220 may include one or more network interfaces 222 for wired or wireless communication with one or more devices or systems of a network, such as network 210. The network interface(s) 222 may include wired links (e.g., Ethernet cable) and/or wireless links (e.g., one or more antennas) for intra-network and/or inter-network communications. One or more of the network interfaces 222 may be used for sending control signals to the traffic signals 202, 204, 206, 208 and/or for receiving sensor data from the sensors (e.g. cameras 212). In some embodiments, the traffic signals and/or sensors may communicate with the controller device, directly or indirectly, via other means (such as an I/O interface 232).

The controller device 220 may also include one or more storage units 224, which may include a mass storage unit such as a solid state drive, a hard disk drive, a magnetic disk drive and/or an optical disk drive. The storage units 224 may be used for long-term storage of some or all of the data stored in the memory 228 described below.

The controller device 220 may include one or more memories 228, which may include a volatile or non-volatile memory (e.g., a flash memory, a random access memory (RAM), and/or a read-only memory (ROM)). The non-transitory memory(ies) 228 may store instructions for execution by the processor device(s) 225, such as to carry out examples described in the present disclosure. The memory(ies) 228 may include software instructions 238, such as for implementing an operating system and other applications/functions. In some examples, the memory(ies) 228 may include software instructions 238 for execution by the processor device 225 to implement a reinforcement learning model 240, as described further below. In some examples, the memory(ies) 228 may include software instructions 238 for execution by the processor device 225 to implement a simulator module 248, as described further below. The reinforcement learning model 240 and simulator module 248 may be loaded into the memory(ies) 228 by executing the instructions 238 using the processor device 225.

In some embodiments, the simulator module 248 may be traffic micro-simulation software, such as Simulation of Urban Mobility (SUMO) software. SUMO is open source microscopic traffic simulator software that provides the option for users and developers to customize parameters and features of the simulation model through a functional interface or Application Programming Interface (API). The API may be used to train a cycle-level traffic signal controller in a simulation environment that is very close to reality, as described in greater detail below. It will be appreciated that the simulator module 248 is only needed during training and not during inference (e.g., deployment in a traffic environment). Accordingly, the simulator module 248 may be present on a training device but not on a controller device 220 using the trained RL model 240 to control actual traffic signals.

In some embodiments, the RL model 240 may be coded in the Python programming language using the tensorflow machine learning library and other widely used libraries, including NumPy. To create a link between the RL model 240 and the simulator module 248, a wrapper may be written in Python to apply the actions of the actor module 244 of the RL model 240 to the SUMO network (i.e. the simulator module 248) and extract and pass the state and reward information back to the RL model 240 (specifically, to the critic module 246). It will be appreciated that other embodiments may use different simulator software, different software libraries, and/or different programming languages.

The memor(ies) 228 may also include one or more samples of traffic environment state data 250, which may be used as training data samples to train the reinforcement learning model 240 and/or as input to the reinforcement learning model 240 for generating traffic signal cycle data after the reinforcement learning model 240 has been trained and the controller device 220 is deployed to control the traffic signals in a real traffic environment, as described in detail below.

In some examples, the controller device 220 may additionally or alternatively execute instructions from an external memory (e.g., an external drive in wired or wireless communication with the controller device 220) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The controller device 220 may also include a bus 242 providing communication among components of the controller device 220, including those components discussed above. The bus 242 may be any suitable bus architecture including, for example, a memory bus, a peripheral bus or a video bus.

It will be appreciated that various components and operations described herein can be implemented on multiple separate devices or systems in some embodiments.

Example Reinforcement Learning Models

In some embodiments, a self-learning traffic signal controller interacts with a real or simulated traffic environment and gradually finds an optimal strategy to apply to traffic signal control. The controller (such as controller device 220) generates traffic signal cycle data by applying a function to traffic environment state data, and using a learned policy to determine a course of action (i.e. traffic signal control actions in the form of traffic signal cycle data) based on the output of the function. The function is approximated using a model trained using reinforcement learning, sometimes referred to herein as a "reinforcement learning model". The reinforcement learning model (such as reinforcement learning model 240) may be an artificial neural network, such as a convolutional neural network, in some embodiments. In some embodiments, the traffic environment state data (such as traffic environment state data 250) may be formatted as one or more two-dimensional matrices, thereby allowing the convolutional neural network or other RL model to apply known image-processing techniques to generate the traffic signal cycle data.

Reinforcement learning (RL) is a technique suitable for optimal control problems that have highly complicated dynamics. These problems may be difficult to model, difficult to control, or both. In RL, the controller can be functionally represented as an agent having no knowledge of the environment that it is working on. In early stages of training, the agent starts taking random actions, called exploration. For each action, the agent observes the changes in the environment (e.g., through sensors monitoring a real traffic environment, or through receiving simulated traffic environment from a simulator), and it also receives a numerical value called a reward, which indicates a degree of desirability of its actions. The objective of the agent is to optimize the cumulative reward over time, not the immediate reward it receives after any given action. This optimization of cumulative reward is necessary in domains such as traffic signal control, in which the actions of the agent affect the future state of the system, requiring the agent to consider the future consequences of its actions beyond their immediate impact. As training progresses, the agent starts learning about the environment and takes fewer random actions; instead, it takes actions that, based on its experience, lead to better performance of the system.

In some embodiments, an actor-critic reinforcement learning model is used by the controller. In particular, a Proximal Policy Optimization (PPO) model may be used in some embodiments, which is a variation of a deep actor-critic RL model. Actor-critic RL models can generate continuous action values (e.g., traffic signal cycle phase durations) as output. An actor-critic RL model has two parts: an actor, which defines the policy of the agent, and a critic, which helps the actor to optimize its policy during training. The output of the actor can be represented by the policy:

$$\pi(a_t|s_t;\theta) \quad \text{(Equation 1)}$$

representing the probability it of choosing action $a_t$ in state $s_t$ given model parameters $\theta$. The output of the critic can be represented as:

$$V^\pi(s_t|\theta_v) \quad \text{(Equation 2)}$$

representing the estimated expected value V of the state $s_t$ given policy it and model parameters $\theta_v$.

As described above, the goal of RL is to optimize the expected cumulative reward of the agent, also known as the return:

$$R_t = \Sigma_{k=0}^\infty \gamma^k r_{t+k} \quad \text{(Equation 3)}$$

wherein $r_t$ is the reward signal at time step t, and $\gamma \in (0,1]$ is the discount factor for stability reasons and to account for the future characteristics of the agent. The lower the value of $\gamma$, the more important the immediate rewards are for the agent and the less important the future rewards are.

The agent tries to estimate the expected return (i.e. the value function) of the current policy at a state $s_t$ using a function approximator with parameters $\theta_v$:

$$V(s_t|\theta_v) = E[\Sigma_{k=0}^\infty \gamma^k r_{t+k}] = E[r_t + \gamma r_{t+1} + \gamma^2 r_{t+2} + \ldots] = E[r_t + \gamma V(s_{t+1};\theta)] \quad \text{(Equation 4)}$$

such that the value function is the probabilistic expectation of the cumulative time-discounted reward.

In an actor-critic model, the value function error (also called a loss function) calculated by the critic is defined as:

$$L(\theta_{v,t}) = E[(r_t + \gamma V(s_{t+1};\theta_{v,t-1}) - V(s_t;\theta_{v,t}))^2]. \quad \text{(Equation 5)}$$

Thus, the parameters $\theta$, of the value function V are updated in accordance to the gradient of the error function $L(\theta_{v,t})$ with respect to the weights of the neural network, as follows:

$$R = r_t + \gamma V(s_{t+1};\theta_{v,t-1}) \quad \text{(Equation 6)}$$

$$d\theta_{v,t} = \partial(R - V(s_t;\theta_{v,t}))/\partial\theta_{v,t}. \quad \text{(Equation 7)}$$

The actor produces the policy of the agent. The policy generates the probability of choosing action a in state $s_t$:

$$\pi(a|s_t;\theta_a). \quad \text{(Equation 8)}$$

If the agent takes an action that leads to a better return than the expected return, then the policy should be adjusted to increase the probability of choosing that action; similarly, actions with a less than expected return should result in adjusting the policy to decrease the probability of taking those actions. Hence, the actor updates the parameters $\theta$ defining the policy as follows:

$$d\theta_a = \nabla_{\theta_a} \log \pi(a|s_t;\theta_a)(R - V(s_t;\theta_{v,t})) \quad \text{(Equation 9)}$$

wherein $V(s_t;\theta_{v,t})$ estimates the expected return of state $s_t$, and $R - V(s_t; \theta_{v,t})$ indicates the advantage of action a compared to the expected return. The term $R - V(s_t; \theta_{v,t})$ is referred to as the "advantage function" in this example. However, because other approaches may be used to calculate the advantage, an advantage function may be referred to generically as $A_t$. One example advantage function, used in the present example, is $A_t = R - V(s_t, \theta_{v,t})$; however, other approaches to calculating advantage can be used as well.

This policy update is only valid when the samples (i.e. state, action, reward, and next state) are drawn from the policy $\pi(a|s_t;\theta)$, or at least from a policy very similar to $\pi(a|s_t;\theta)$. Therefore, the policy cannot be updated using old samples if the actor updates the policy based on Equations 5-9 above. In order to use older samples, PPO may be employed to adjust the value used in Equations 5-9 above. In a PPO algorithm, the current policy may be updated using older samples as long as the policy that the samples were drawn from does not differ from the current policy by more than a certain amount.

PPO makes two modification to the actor-critic algorithm describe above. The first change is intended to account for the update being based on older samples from a different policy. The second change is intended to make sure the that policy ($\pi(a|s_t; \theta_{old})$) that the older samples are from is not significantly different from the current policy ($\pi(a|s_t; \theta)$). The loss function is calculated in accordance with these two changes. Thus, $r_t(\theta)$ denotes the probability ratio $$r_t(\theta) = \frac{\pi(a|s_t;\theta)}{\pi(a|s_t;\theta_{old})},$$

such that $r(\theta_{old}) = 1$. The loss function $L(\theta)$ can be redefined as:

$$L(\theta) = E\left[\frac{\pi(a|s_t;\theta)}{\pi(a|s_t;\theta_{old})} A_t\right] = E[r_t(\theta)A_t]. \quad \text{(Equation 10)}$$

However, without a constraint, maximization of $L(\theta)$ would lead to an excessively large policy update. Accordingly, the objective should be modified, in order to penalize changes to the policy that move $r_t(\theta)$ away from 1. Thus, the final form of the loss function $L^{CLIP}(\theta)$ of the actor in a PPO model is:

$$L^{CLIP}(\theta)=E[\min(r_t(\theta)A_t,\mathrm{clip}(r_t(\theta),1-\epsilon,1+\varsigma)A_t)] \quad \text{(Equation 11)}$$

wherein $\in$ is a hyperparameter that limits the variation of the policy due to updates. The loss function for the critic stays the same as in a conventional actor-critic RL model, as defined by Equation 5 above.

Example Training Methods

The RL model 240 used by the controller device 220 must be trained before it can be deployed for effecting control of a traffic signal in a real traffic environment. Training is carried out by supplying traffic environment data to the RL model 240, using the traffic signal cycle data generated by the RL model 240 to control the traffic signals in the traffic environment, then supplying traffic environment data representing the updated state of the traffic environment data to the RL model for use in adjusting the RL model policy and for generating data for future traffic signal cycles. Traffic environment data is described in greater detail below with reference to FIGS. 5-11C.

Training may be conducted using data from a simulated traffic environment, e.g., using simulator module 248. The simulator module 248 may generate simulated traffic environment data and provide the simulated traffic environment data to the RL model 240. The RL model 240 generates traffic signal cycle data, which is provided to the simulator module 248 and used to model the response of the traffic environment to the traffic signal cycle applied by a simulated traffic signal. In some embodiments, the RL model 240 may be trained using a simulated traffic environment in the early stages of training, but later fine-tuning of the RL model 240 may be performed using a real traffic environment.

Figure 4:
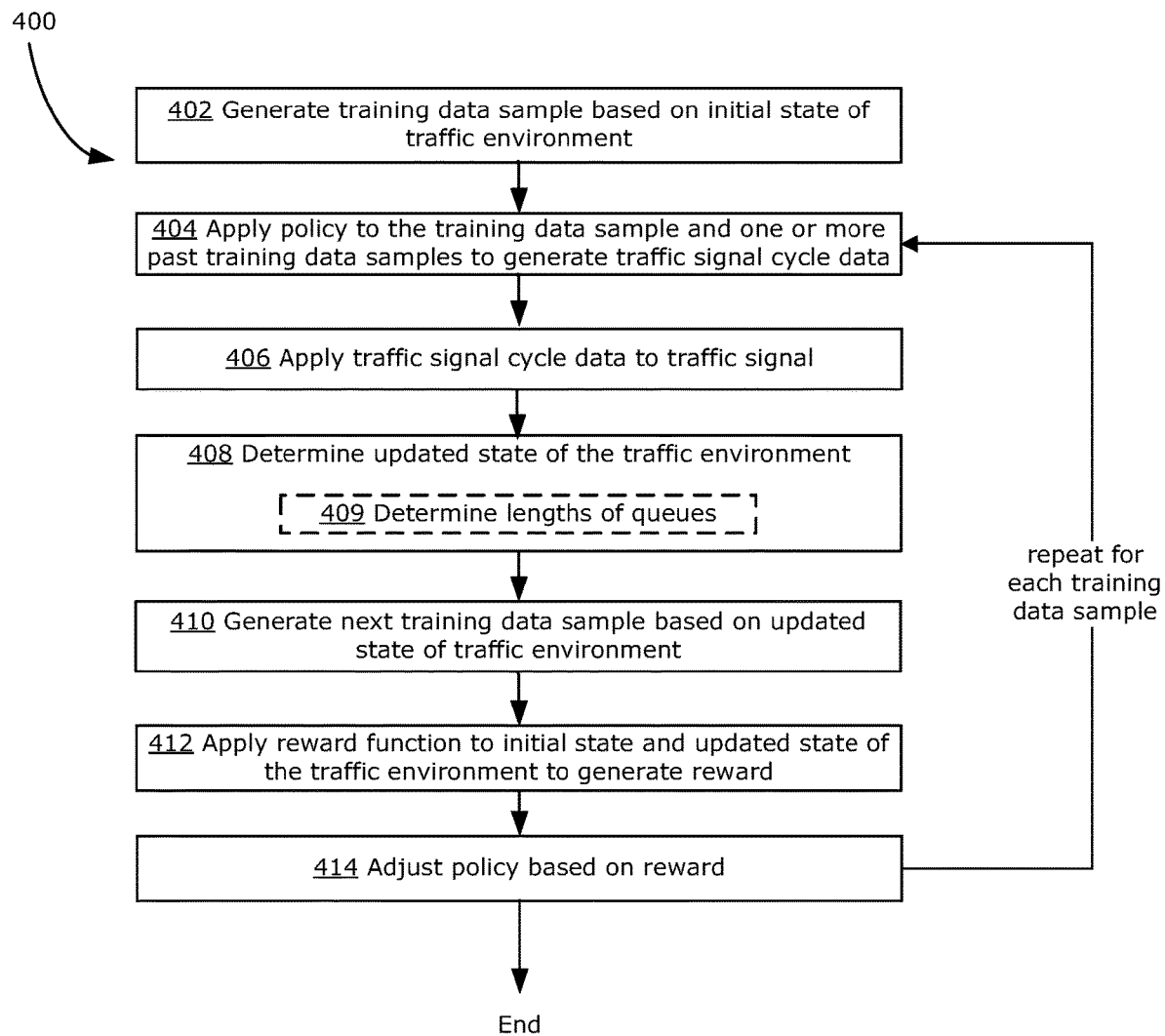
FIG. 4 is a flowchart showing steps of an example method for training a reinforcement learning model to generate traffic signal cycle data, in accordance with embodiments described herein.

FIG. 4 shows an example method 400 of training a reinforcement learning model to generate traffic signal cycle data.

At 402, a training data sample is generated based on an initial state of the traffic environment. If the traffic environment is a real traffic environment, the state of the traffic environment may be determined by a traffic monitoring system based on input from sensors monitoring the traffic environment (e.g., cameras 212). The traffic monitoring system may be separate from the controller device 220 and may communicate with the controller device 220 via the network 210. In some embodiments, the controller device 220 may receive the sensor data directly from the sensors, relay the sensor data to the traffic monitoring system, then receive the processed traffic environment data from the traffic monitoring system. In other embodiments, the traffic monitoring system may be implemented as part of the controller device. The traffic monitoring system may include, e.g., computer visions systems for determining vehicle velocity, location, and/or density data within the traffic environment based on the sensor data, as described in greater detail below with reference to FIG. 5. The traffic environment data may be formatted as a training data sample when received by the controller device 220, or the controller device 220 may reformat the traffic environment data into a training data sample before providing it to the RL model 240.

At 404, upon receiving the training data sample, the actor module 244 of the RL model applies its policy to the training data sample (corresponding to $s_t$) and one or more past training data samples (corresponding to $s_j$, wherein j<t) to generate traffic signal cycle data, as described in greater detail below with reference to FIGS. 5-11C, and in particular FIG. 9. In some embodiments, as described with reference to FIG. 10D, the one or more past training data samples may correspond to points in time at which the traffic signal transitions between two phases. In other embodiments, the one or more past training data samples may correspond to points in time at which a length of a queue of stationary vehicles in the traffic environment is at a maximum value or minimum value.

The traffic signal cycle data generated at step 404 may be one or more phase durations of one or more respective phases of a traffic signal cycle. In some embodiments, each phase duration is a value selected from a continuous range of values. This selection of a phase duration from a continuous range of values may be enabled in some examples by the use of an actor-critic RL model, as described in detail above.

In some embodiments, the traffic signal cycle data generated at step 404 includes phase durations for each phase of at least one cycle of the traffic signal. In other embodiments, the traffic signal cycle data generated at step 404 includes a phase duration for only one phase of a cycle of the traffic signal. Cycle-level control and phase-level control may present trade-offs between granularity and predictability.

At 406, the traffic signal cycle data is applied to the traffic signal, real or simulated. In the case of a real traffic environment using real traffic signals, the controller device 220 may send control signals to the traffic signal (e.g., lights 202, 204, 206, 208) to effect the phase durations dictated by the traffic signal cycle data. In the case of a simulated traffic environment, the RL model provides the traffic signal cycle data to the simulator module 248, which simulates the response of the traffic environment to the phase durations of the traffic signal cycle data as effected by the simulated traffic signal.

At 408, an updated state of the traffic environment is determined. As at step 402, the traffic environment state may be determined by a traffic monitoring system based on sensor data from the traffic environment (if using a real traffic environment), or by the simulator module 248 (if using a simulated traffic environment).

Step 408 may include, optionally, sub-step 409, at which the traffic monitoring system or simulator module 248 determines the lengths of one or more queues of stationary vehicles in the traffic environment. This data may be used in calculating the reward, as described in greater detail below with reference to FIGS. 10A-11C.

At 410, a new training data sample is generated based on the updated state of the traffic environment determined at step 408. In some embodiments, the frequency with which step 410 is performed may be different from the frequency with which step 408 (and optionally step 409) is performed: for example, training data samples may only be generated by step 410 at points in time corresponding to transitions between phases of the traffic signal cycle (i.e. a new training data sample is generated when Phase 1 102 ends and Phase 2 104 begins, and another training data sample is generated when Phase 2 104 ends and Phase 3 106 begins), whereas the updated state of the traffic environment may be determined by step 408 every second or even more frequently.

At 412, the reward function is applied to the initial state of the traffic environment and the updated state of the traffic environment to generate a reward value, as described above. The initial state may be regarded as $s_t$, whereas the updated state may be regarded as $s_{t+1}$, for the purposes of calculating the reward using the critic module 246, e.g., as shown in Equations 1-11 above.

At 414, the actor module 244 adjusts its policy based on the reward generated at step 412. The weights or parameters of the RL model may be adjusted using RL techniques, including the PPO actor-critic techniques described in detail above.

The method 400 then returns to step 404 to repeat the step 404 of processing a training data sample, the training data sample (generated at step 410) now indicating the updated state of the traffic environment (determined at step 408). This loop may be repeated one or more times (typically at least hundreds or thousands of times) to continue training the RL model.

Thus, method 400 may be used to train the RL model and update the parameters of its policy, in accordance with the actor-critic RL techniques described above or with other RL techniques.

Examples of Traffic Signal Cycle Data

The action space used by the actor module 244 of the RL model 240 may be a continuous action space, such as a natural number space, in some embodiments. Embodiments operating at cycle-level or phase-level control of the traffic signal have relatively low frequency interaction with the traffic signal relative to existing second-level approaches: a cycle-level controller may send control signals to the traffic signal once per cycle, for example at the beginning of the cycle, whereas a phase-level controller may send control signals to the traffic signal once per phase, for example at the beginning of the phase.

Thus, for a traffic signal having P phases per cycle (e.g., P=8 in the example of FIG. 1), the output of a reinforcement learning model 240 using cycle-level control is P natural numbers, each indicating the length of a traffic signal phase. Examples of traffic signal cycle data comprising a plurality of phase durations are described in reference to FIG. 9 below. A reinforcement learning model 240 using phase-level control may generate only one natural number indicating the length of a traffic signal phase. Other embodiments may generate different numbers of phase durations.

In some embodiments, the phase durations generated by the reinforcement learning model 240 are selected from a different continuous range, such as positive real numbers. The use of an actor-critic RL model may enable the generation of phase durations selected from a continuous range of values, rather than a limited number of discrete values (such as 5-second or 10-second intervals as in existing approaches).

Examples of Traffic Environment State Data

As described above, the controller device 220 provides traffic environment data to the RL model 240, which generates traffic signal cycle data and adjusts its policy based on said traffic environment data. Examples will now be described of how traffic environment data may be collected, represented, and formatted as training data samples or traffic environment state data for use by the RL model.

Different state spaces may be used in different embodiments to represent the state of the traffic environment as traffic environment data. Generally, traffic environment data will include traffic data indicating some aspect of the behavior and/or presence of vehicle traffic in the environment. In some embodiments, the traffic environment data includes a queue length for each traffic lane in the traffic environment, each queue length indicating the length of a queue of stationary vehicles in that lane. Thus, if the traffic environment encompasses a 50 meter radius around the center of a four-way intersection of two four-lane roads (i.e. two lanes northbound, two lanes southbound, two lanes eastbound, two lanes westbound), the traffic environment data may include eight queue lengths indicating the number of stationary vehicles within 50 meters of the intersection in each lane at time t. Examples of queue lengths are described below with reference to FIGS. 10A-11C.

In some embodiments, the traffic environment data includes location data for each of a plurality of vehicles in the traffic environment. In some embodiments, the traffic environment data includes velocity data for each of a plurality of vehicles in the traffic environment. For example, the traffic data included in the traffic environment data may include a location and a velocity for each vehicle within 50 meters of the intersection.

In some embodiments, the traffic environment data includes traffic density data for each of a plurality of regions of the traffic environment. In some embodiments, the traffic environment data includes traffic velocity data for each of a plurality of regions of the traffic environment. For example, the traffic data included in the traffic environment data may include a vehicle density (e.g., number of vehicles) and a vehicle velocity (e.g., mean velocity of each vehicle) for each of a plurality of regional cells within 50 meters of the intersection. An example of such an embodiment will be described with reference to FIG. 5.

Figure 5:
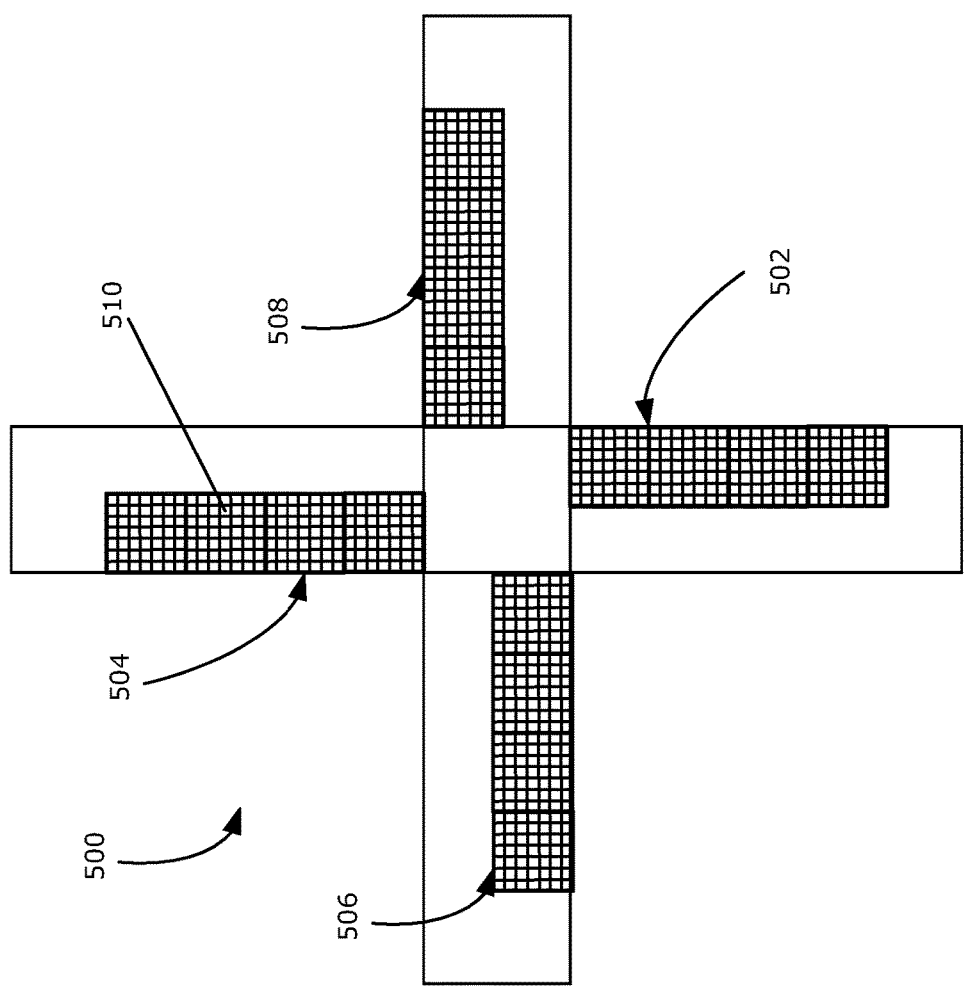
FIG. 5 is a top view of a traffic environment at an intersection, showing segmentation of the traffic lanes into cells in accordance with embodiments described herein.

FIG. 5 shows a top view of a traffic environment 500 at an intersection, showing segmentation of the traffic lanes into cells. The northbound lanes are segmented into northbound cells 502, the southbound lanes are segmented into southbound cells 504, the eastbound lanes are segmented into eastbound cells 506, and the westbound lanes are segmented into westbound cells 508. Each cell 510 corresponds to a square region of the road surface of the traffic environment. In this example, traffic environment data provided to the RL model 240 may include traffic data indicating vehicle density data and vehicle velocity data for each cell 510. The vehicle density data may be, e.g., a count of the number of vehicles present within the cell at time t. The vehicle velocity data may be, e.g., a mean or other aggregate measure of the velocities of the vehicles present within the cell at time t. Each cell 510 may be the width of a single lane in some embodiments. In some embodiments, the shapes of the cells may be irregular: for example, each cell may be aligned with the directionality of the lane and may be the width of the lane, but the length of the cell may be longer or shorter than its width.

It will be appreciated that the number of cells shown in FIG. 5 is not intended to be to scale: whereas each direction of traffic is segmented into a matrix of cells seven cells wide, the figure is not necessarily intended to indicate that the intersection 500 includes seven lanes of traffic in each direction. Rather, in each of the drawings, the number and size of cells is arbitrary and need not correspond to the description of the corresponding traffic environment.

Figure 6:
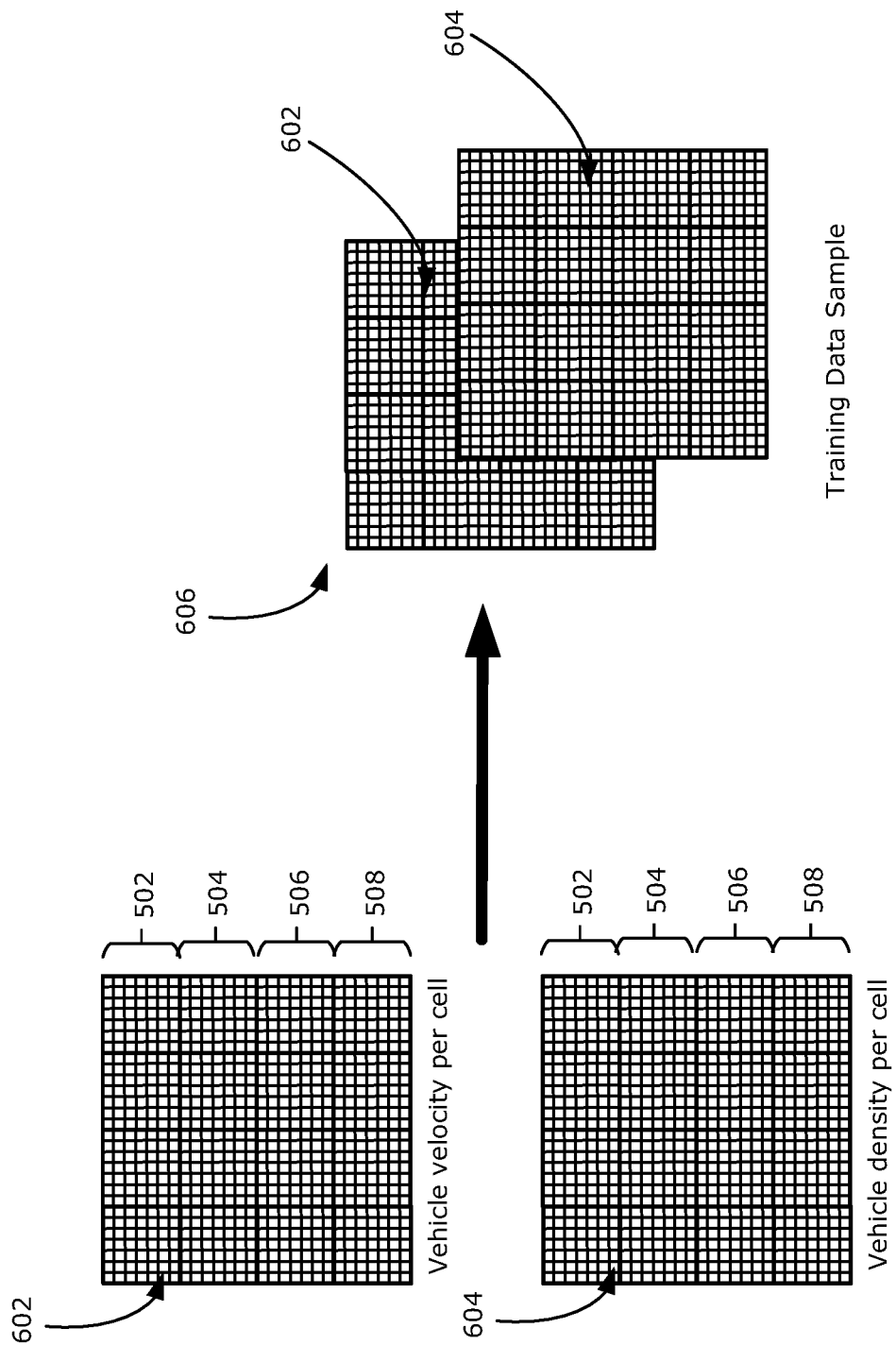
FIG. 6 is a schematic diagram of vehicle velocity and vehicle density data of the cells of FIG. 5 converted into traffic environment state data used as a training data sample, in accordance with embodiments described herein.

FIG. 6 shows the vehicle velocity data 602 and vehicle density data 604 of the cells of FIG. 5 as traffic environment state data. The data from the cells from each lane direction 502, 504, 506, 508 are concatenated into a two-dimensional matrix of vehicle velocity data 602 and a two-dimensional matrix of vehicle density data 604, wherein the data from each set of lanes is represented as a horizontal band of the matrix. Thus, for example, the leftmost cells of the vehicle velocity data matrix 602 may indicate, from the top, the average velocity of the vehicles present in each northbound lane directly adjacent to the intersection (e.g., stopped at a red light adjacent to the pedestrian crossing), followed by the average velocity of the vehicles present in each southbound lane directly adjacent to the intersection, followed by each eastbound lane, followed by each westbound lane.

The vehicle velocity data matrix 602 and vehicle density data matrix 604 may be converted into a training data sample 606 prior to being provided to the RL model 240. In some embodiments, the training data sample 606 may be represented as two two-dimensional matrices as shown in FIG. 6, and may be processed by the RL model 240 using techniques for processing an image having two channels. In other embodiments, the training data sample 606 may be represented as a single two-dimensional matrix by concatenating or appending the vehicle velocity data matrix 602 next to the vehicle density data matrix 604 to form a single larger two-dimensional matrix, which may be processed by the RL model 240 using techniques for processing an image having one channel.

In some embodiments, traffic environment data may take other forms. For example, the traffic environment data may simply include a number of vehicles present in each lane, or each set of lanes for a given direction, in the environment, and/or an aggregate velocity measurement for each lane or set of lanes in a given direction. It will be appreciated that other forms of traffic environment data may be used in different embodiments.

As described above, the traffic environment data may be generated by a traffic monitoring system based on sensor data collected from the traffic environment, and in some embodiments the traffic monitoring system may be part of the controller device 220.

Thus, the traffic environment data provided as input to the reinforcement learning model 240 may represent a state of the traffic environment as of time t, thereby allowing the reinforcement learning model 240 to generate traffic signal cycle data in response to current traffic conditions.

Figure 8:
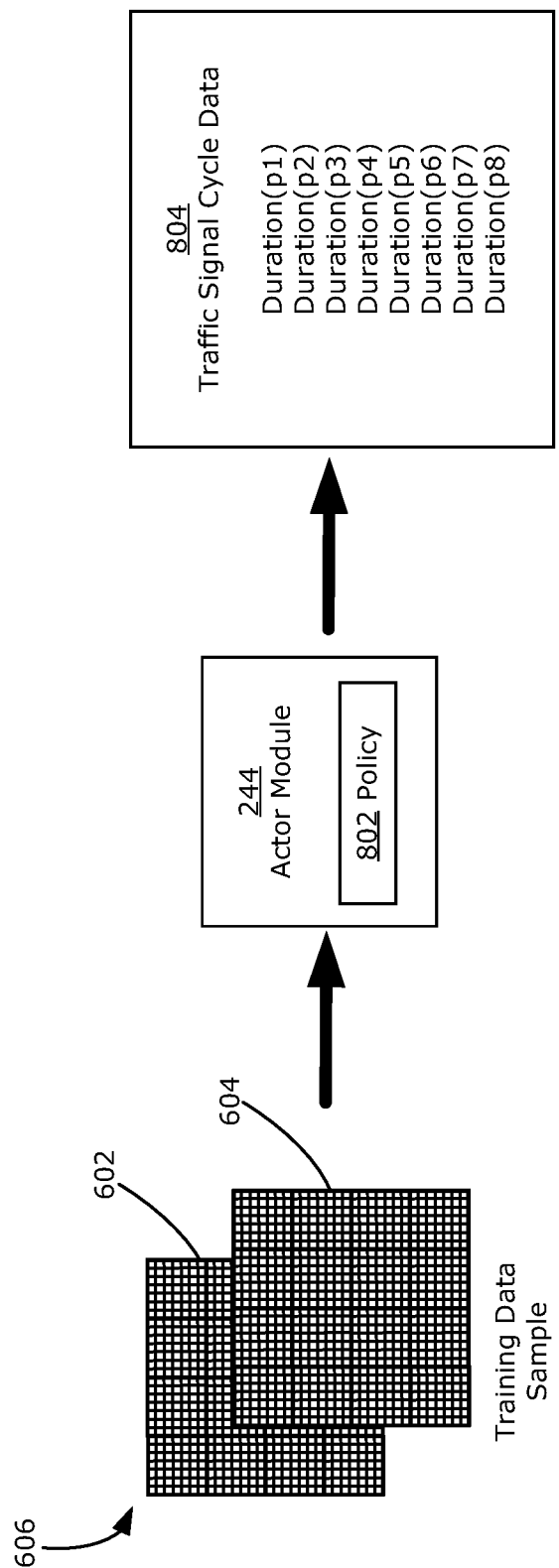
FIG. 8 is a block diagram of an example actor module of a traffic signal controller showing traffic environment state data for one point in time as input and generated traffic signal cycle data as output, in accordance with embodiments described herein.

FIG. 8 shows an example actor module 244 of a traffic signal controller receiving traffic environment state data (e.g., training data sample 606) for a single point in time t. In response, the actor module 244 uses the policy 802 to generate traffic signal cycle data 804 as output. The traffic signal cycle data 804 includes eight natural numbers p1 through p8, each representing a phase duration for a phase in the eight-phase traffic signal cycle 100 (P=8) of FIG. 1.

However, whereas information representing the state of the traffic environment at a single time t may be sufficient for a second-level controller or for some cycle-level or phase-level controllers, some embodiments may use traffic environment data representing the state of the traffic environment at more than one point in time. Data corresponding to each of the multiple points in time may be provided to the RL model 240 (e.g., to the actor module 244), and the RL model 240 may generate the traffic signal cycle data in response to receiving these data.

Figures 7A, 7B:
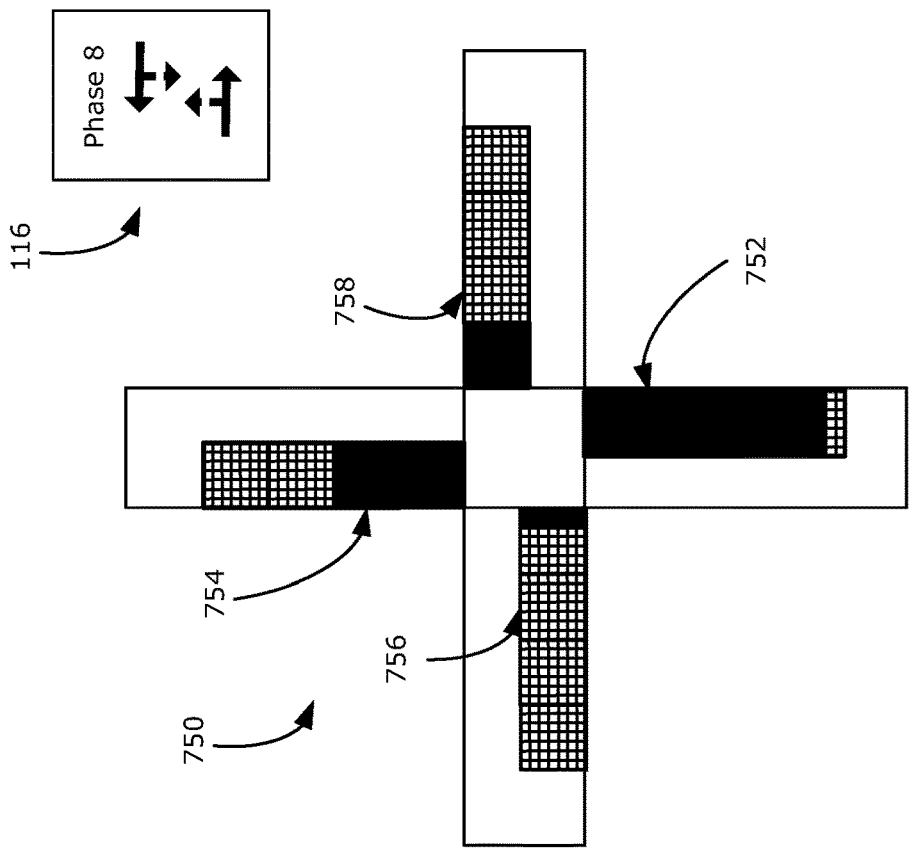
FIG. 7A is a top view of the traffic environment of FIG. 5 at the end of phase 4 of the traffic signal cycle of FIG. 1 showing varying vehicle queue lengths for different traffic directions, in accordance with embodiments described herein.
FIG. 7B is a top view of the traffic environment of FIG. 5 at the end of phase 8 of the traffic signal cycle of FIG. 1 showing varying vehicle queue lengths for different traffic directions, in accordance with embodiments described herein.

FIGS. 7A and 7B illustrate the potential importance of using historical traffic environment data (i.e. data from one or more times in the past, before time t) to generate traffic signal cycle data. FIG. 7A shows the traffic environment 700 at the end of phase 4 108 of the traffic signal cycle 100, showing varying stationary vehicle queue lengths for different traffic directions as blacked-out cells in each lane. Specifically, at the end of phase 4, the northbound cells 702 and southbound cells 704 may show short queues of stationary vehicles because vehicles in those lanes have been able to move through the intersection freely during phase 4. However, the eastbound cells 706 and westbound cells 708 may show longer queues of stationary vehicles, because those vehicles have been unable to proceed through the intersection during phase 4. Similarly, FIG. 7B shows the traffic environment 750 at the end of phase 8 116 of the traffic signal cycle 100, showing varying vehicle queue lengths for different traffic directions. Specifically, at the end of phase 8, the northbound cells 752 and southbound cells 754 may show long queues of stationary vehicles because vehicles in those lanes have been unable to proceed through the intersection during phase 8. However, the eastbound cells 756 and westbound cells 758 may show shorter queues of stationary vehicles, because those vehicles have been able to move freely through the intersection during phase 8.

If the RL model 240 makes a decision at the end of phase 4 108, and consequently receives the traffic environment data corresponding to traffic environment 700 of FIG. 7A, the traffic signal cycle generated by the RL model may attempt to prioritize phases that will relieve the long queues of the eastbound cells 706 and westbound cells 708, such as phase 5 110 through phase 8 116 (i.e., phase 5 110 through phase 8 will all have relatively long phase durations), whereas the phases that relieve northbound and southbound queues will be de-prioritized (i.e. phase 1 102 through phase 4 108 will all have relatively short phase durations). Conversely, if the RL model 240 makes a decision at the end of phase 8 116, and consequently receives the traffic environment data corresponding to traffic environment 750 of FIG. 7B, the traffic signal cycle generated by the RL model may attempt to prioritize phases that will relieve the long queues of the northbound cells 702 and southbound cells 704, whereas the phases of phases that relieve eastbound and westbound queues will be de-prioritized.

Accordingly, some embodiments may provide, as input to the RL model 240, traffic environment data corresponding to one or more times in the past corresponding to one or more past phases of a cycle. In some embodiments, traffic environment data is provided for a point within each phase of a full cycle.

Figure 9:
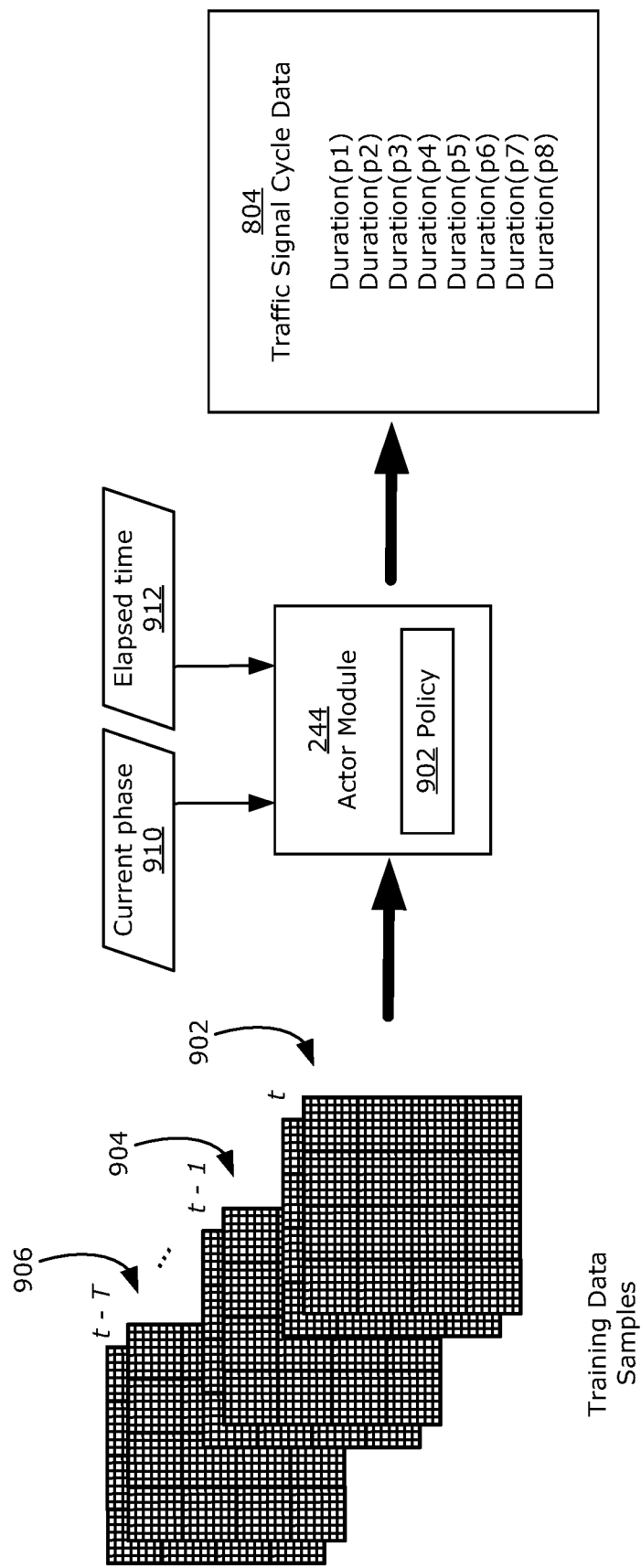
FIG. 9 is a block diagram of an example actor module of a traffic signal controller showing traffic environment state data for multiple points in time as inputs and generated traffic signal cycle data as output, in accordance with embodiments described herein.

FIG. 9 shows an example actor module 244 of a traffic signal controller showing traffic environment state data (e.g., training data samples) for multiple points in time as inputs. A first training data sample 902 corresponds to the traffic environment state at time t (e.g., the current time), a second first training data sample 904 corresponds to the traffic environment state at time t−1 (e.g., a time during the previous phase), and so on through a $T^{th}$ training data sample 906 corresponds to the traffic environment state at time t-T (e.g., a time during a phase T phases ago, wherein T may be equal to P or P−1 in some embodiments).

In this example, the actor module 244 also receives traffic signal phase data inputs indicating the current phase of the traffic signal cycle 910 and an elapsed time during the current phase 912. These additional input 910, 912 serve to situate the current time t and its corresponding traffic environment state within the traffic signal cycle.

The actor module 244 uses the policy 902 to generate the traffic cycle data 804 based on the training data samples 902, 904, 906, in accordance with the techniques described above in the Example Reinforcement Learning Models section.

It will be appreciate that the historical traffic environment data (e.g., training data samples 904 through 906) may correspond to multiple points in time within a given phase, to points in time spanning more than one cycle, or other distribution of historical state data in different embodiments. For example, each time interval of 1 unit (i.e. the time between t−1 and t) may correspond to the duration of a particular phase of the traffic signal cycle, or it may correspond to a fixed duration such as one second.

Different embodiments may select historical traffic state data for use as RL model inputs using different approaches. In some embodiments, each past point in time (i.e. t−1 through t-T) may correspond to a time at which the queue lengths of the traffic environment reach a local maximum or a local minimum. Other approaches may approximate these local minima and local maxima based on the times at which the traffic signal cycle transitions from one phase to the next.

FIGS. 10A through 10D show various approaches to selecting past points in time (i.e. t−1 through t-T) for selecting traffic environment data as input to the RL model 240.

Figure 1:
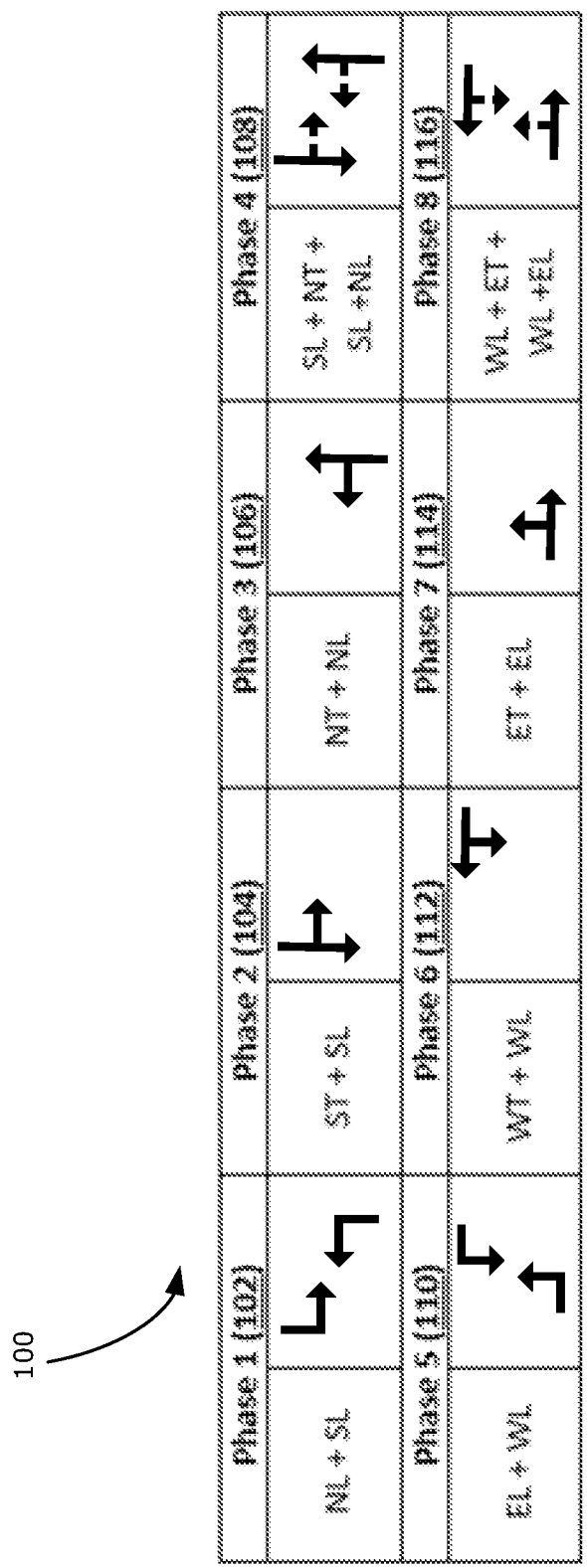
FIG. 1 is a table showing eight phases of an example traffic signal cycle, showing an example operating environment for example embodiments described herein.
Figures 10A, 10B, 10C, 10D:
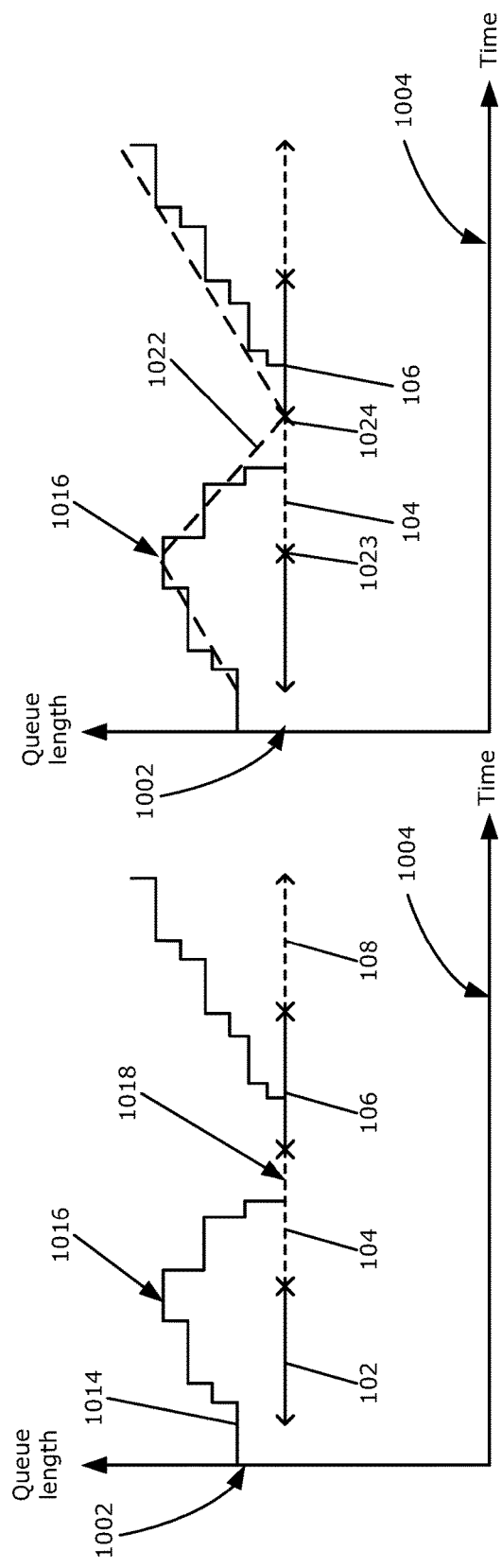
FIG. 10A is a graph of vehicle queue length over time for southbound traffic at the example traffic environment of FIG. 5 during the first four phases of the traffic signal cycle of FIG. 1, in accordance with embodiments described herein.
FIG. 10B is the graph of FIG. 10A showing queue length approximated as a linear interpolation between queue lengths at phase transition times, in accordance with embodiments described herein.
FIG. 10C is the graph of FIG. 10B showing queue lengths at phase transition times for southbound and northbound traffic, in accordance with embodiments described herein.
FIG. 10D is the graph of FIG. 10C showing training data samples generated at phase transition times, in accordance with embodiments described herein.

FIG. 10A shows a graph of vehicle queue length 1002 over time 1004 for southbound traffic at the example traffic environment 500 of FIG. 5 during the first four phases 102, 104, 106, 108 of the traffic signal cycle 100 of FIG. 1. The southbound queue length 1014 (e.g., a longest queue length of each of the southbound lanes) can be observed to grow during phase 1 102 until it reaches a local maximum 1016, then drop during phase 2 104 until it reaches a local minimum 1018 of zero. During phase 3 106, the southbound queue length 1014 begins to grow again.

FIG. 10B shows that the queue length 1014 of FIG. 10A may be approximated as a linear interpolation between the local maxima (e.g., maximum 1016) and local minima (e.g., minimum 1018). Furthermore, these local maxima and local minima are very likely to be located at or near the times corresponding to phase transitions within the traffic signal cycle. For example, the southbound queue length 1014 begins to decrease shortly after the transition 1022 between phase 1 102 and phase 2 104, and it begins to increase again shortly after the transition 1024 between phase 2 104 and phase 3 106. Thus, a linear interpolation 1022 may be plotted between the queue lengths at these phase transition times (e.g., 1022 and 1024) to approximate the graph 1014 of the actual queue length.

FIG. 10C shows the linear interpolation of the southbound queue length 1022 as well as a linear interpolation of a northbound queue length 1040. The queue lengths at phase transition times are shown as circles: an estimated maximum of the southbound queue length 1032 at the transition from phase 1 102 to phase 2 104; an estimated minimum of the southbound queue length 1034 and an estimated maximum of the northbound queue length 1036 at the transition from phase 2 104 to phase 3 106; and an estimated minimum of the northbound queue length 1038 at the transition from phase 3 106 to phase 4 108.

FIG. 10D shows training data samples generated at the phase transition times selected in FIG. 10C. A first training data sample 1052 represents traffic environment state data from the transition 1022 between phase 1 102 and phase 2 104; a second training data sample 1054 represents traffic environment state data from the transition 1024 between phase 2 104 and phase 3 106; and a third training data sample 1056 represents traffic environment state data from the transition between phase 3 106 and phase 4 108. Each training data sample 1052, 1054, 1056 may be generated as described above in reference to FIG. 6.

Thus, in some embodiments, the past training data samples are selected from points in time corresponding to one or more queue peak times and one or more queue trough times. Each queue peak time is a time at which the length of one of the queues was at a local maximum, and each queue trough time is a time at which a length of one of the queues was at a local minimum. In other embodiments, the past training data samples correspond to one or more phase transition times. Each phase transition time is a time at which the traffic signal transitions between two phases of the traffic signal cycle.

The estimation of queue lengths based on phase transition times described above with reference to FIGS. 10A-10D is premised on the dynamics of traffic build-up and release following a semi-linear pattern. Using this assumption, some embodiments may significantly decrease the input size of the controller relative to embodiments using historical data for each second or each s seconds (s<<[p1 . . . p8]), while providing sufficient information to the controller to enable decision-making informed by traffic conditions over one or more traffic signal cycles.

In some embodiments using historical traffic environment data as described in reference to FIG. 10A-10D, the state space is the traffic environment data at the critical points for at least one cycle, stacked together (as shown by training data samples 902 through 906 in FIG. 9), as well as the traffic signal phase data inputs indicating the current phase of the traffic signal cycle 910 and the elapsed time during the current phase 912.

Example Reward Functions

Different embodiments may use different reward functions. A reward function may use a traffic flow metric or performance metric intended to achieve certain optimal outcomes.

In some embodiments, the reward is based on the negative average number of stopped (i.e. stationary) vehicles in the traffic environment over the last cycle. A vehicle may be considered stationary if its speed (e.g., the magnitude of its velocity vector, or the scalar projection of its velocity vector onto the traffic directionality for its lane or region) is below a speed threshold. In some examples, a speed threshold of 2 meters per second may be used. A total delay spent at the intersection during a cycle may be calculated by summing the delay (i.e. time spent being stationary) for each vehicle present in the traffic environment during the cycle. In embodiments using region-based velocity and density data, an aggregate measure of total delay may be calculated by treating any cell with vehicle velocity below the speed threshold as a stationary cell, and treating a stationary cell as representing a number of stationary vehicles equal to the number of vehicles present in the cell. Other approaches may be used to calculate a total delay for a traffic signal cycle.

FIGS. 11A-11C show three approaches to calculating a total delay for vehicles present in a traffic lane within the traffic environment.

FIG. 11A shows a graph 1100 of distance from the intersection 1102 over time 1104, showing the location of stationary vehicles in a single traffic lane. During a first phase of the traffic signal cycle 1118, corresponding to a red light facing the traffic in the lane, the queue grows in length. At a first time near the beginning of the first cycle, the queue has a first length 1112, indicating a few vehicles stopped at the border of the intersection (e.g., at a pedestrian crossing). At a second, later time, the queue has a second length 1114, indicating a few more vehicles stopped behind the first few vehicles. This proceeds through the first phase 1118, until the traffic signal cycle transitions to a second phase 1119. Once the traffic signal cycle proceeds to the second phase 1119, corresponding to a green light facing the traffic in the lane, the queue begins to shorten as the vehicles are allowed to proceed into the intersection. The vehicles closest to the intersection begin moving first, whereas vehicles in the stationary queue farther from the intersection do not have an opportunity to begin moving until the vehicles in front of them have begun moving; thus, the location of the front of the queue moves away from the intersection. Finally, at a final time during the second phase 1119, the queue has a final length 1116 before the last car in the queue begins moving and the queue length becomes zero.

It will be appreciated that the various queue lengths 1112 through 1116 can be bounded by an roughly triangular shape (shown in dashed outline).

The total delay represented by the stationary vehicles shown in FIG. 11A can be calculated by summing the various queue lengths 1112 through 1116 for each point in time, e.g., each second. This calculation yields the area between the two lines that indicate the front and the end of the queue ($A_m^1$).

FIG. 11B shows a second graph 1120 that uses the same traffic environment data as graph 1100 of FIG. 11A, but represents the queue over time by showing the duration during which each vehicle is stationary. Thus, a first vehicle is stationary for a first duration 1122, a second vehicle behind the first vehicle is stationary for a second duration 1124, and so on through a final vehicle which is stationary for a final duration 1126.

In FIG. 11B, the total delay represented by the stationary vehicles can be calculated by summing the various durations 1122 through 1126 for each vehicle. Thus, the cumulative delay for a cycle consisting of the first phase 1118 and second phase 1119, $CD_m^{c1}$, is the summation of the delays of all vehicles in the queue in the cycle ($CD_m^{c1}=d_1+d_2+ \ldots +d_k$), wherein $d_1$ is first duration 1122, $d_2$ is second duration 1124, and $d_k$ is final duration 1126. As in FIG. 11A, this summation is another way of calculating the area between the two lines that indicate the front and the end of the queue ($A_m^1$).

FIG. 11C shows the same graph of queue lengths and stationary vehicle locations of FIGS. 11A-11B, but here the calculation of total delay is performed directly by calculating the area of the triangle 1132, i.e., the area between the two lines that indicate the front and the end of the queue ($A_m^1$).

It will be appreciated that the calculations described with respect to FIGS. 11A-11C may, in some embodiments, be performed using regional data rather than individual vehicle data, e.g., the vehicle density and velocity data per cell from FIG. 5.

Once the area of the triangle 1132 has been calculated by one of the methods described with reference to FIGS. 11A-11C above, the area can be used to determine the cumulative delay of the cycle. Thus, an average number of stopped vehicles over the cycle length (i.e. the duration of the first phase 1118 and second phase 1119) indicates an average delay each vehicle faced during that cycle. An average delay over the cycle length may be calculated and used as the reward to discourage the controller from choosing short cycles to avoid larger penalties.

Thus, in some embodiments, the controller determines the state of the traffic environment at least in part by determining a length of each of one or more queues of stationary vehicles in the traffic environment, wherein the length indicates a number of stationary cars in the queue. This state data is used to generate the training data samples. In some embodiments, the reward function is applied to the initial state of the traffic environment and the updated state of the traffic environment to calculate the reward based on an estimated number of stationary vehicles in the traffic environment over a previous traffic signal cycle.

An algorithm for calculating the reward according to this technique may be represented in pseudo code as:

```
state = NULL
Reward = 0
```

```
For every t in the cycle_length:
    Reward += number of stopped vehicles
    If the signal just turned yellow:
        state = append(current_traffic_state)
Reward /= cycle_length
```

In this example, the number of stopped cars recorded at each point in time t during the cycle are added together, then divided by the cycle duration (i.e. cycle_length) to yield a final value for reward (wherein a high reward indicates poor performance, and a low reward indicates high performance). The state of the traffic environment is sampled (e.g., to generate a further training data sample) each time the light turns yellow.

It will be appreciated that some embodiments may use different performance metrics, such as total throughput (the number of vehicles passing through the intersection per cycle), the longest single delay for a single vehicle over one or more cycles, or any other suitable metric, to determine reward.

Example Systems for Controlling Traffic Signals

Once the RL model 240 has been trained as described above, the controller device 220 may be deployed for use in controlling a real traffic signal in a real traffic environment. When deployed for the purpose of controlling a real traffic signal, the RL model 240 and other components described above operate much as described with reference to the training method 400. However, references to "training data samples" may be understood to refer instead to traffic environment state data, as they are not primarily being used for training purposes. When deployed to control a real traffic signal, the controller device 220 constitutes a system for generating traffic signal cycle data. The controller device 220 includes the components described with reference to FIG. 3, including the processor device 225 and memory 228. The RL model 240 stored in the memory 228 is now a trained RL model 240, which has been trained in accordance with one or more of the techniques described above. The traffic environment used to train the reinforcement learning model is the same real traffic environment now being controlled, or a simulated version thereof, as described above. The instructions 238, when executed by the processor device 225, cause the system to carry out steps very similar to those of method 400. Traffic environment state data indicating a state of the real traffic environment (which may be identical in format and content to training data sample 606 in some embodiments) is received from the traffic monitoring system, which is described above. The reinforcement learning model 240 is used to generate traffic signal cycle data by applying the policy (e.g., policy 802 or policy 902) to at least the traffic environment state data. The controller device 220 then sends, to a traffic control system, the traffic signal cycle data. The traffic controller system may be part of the controller device 220 or may be separate and in communication with the controller device 220, e.g. via the network. The traffic controller system controls the traffic signal (e.g. lights 202, 204, 206, 208) to execute a traffic signal cycle according to the traffic signal cycle data.

Thus, using the embodiments described herein, reinforcement learning may be used to implement a cycle-level traffic signal controller with precision of one second or greater. Some embodiments may achieve second-level or greater precision in their output using Proximal Policy Optimization. The embodiments described herein may use a state space definition that is concise, yet captures all the necessary information to control the traffic signal on a cycle-level basis. A reward function may be used that minimizes the average vehicle delay for the cycle-level traffic signal controller at the signalized intersection.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for training a reinforcement learning model to generate traffic signal cycle data, the method comprising:
   processing a training data sample indicating an initial state of a traffic environment affected by a traffic signal by:
      using the reinforcement learning model to generate the traffic signal cycle data by applying a policy to the training data sample and one or more past training data samples, the traffic signal cycle data comprising one or more phase durations of one or more respective phases of a traffic signal cycle, each phase duration being a value selected from a continuous range of values;
      determining an updated state of the traffic environment following application of the generated traffic signal cycle data to the traffic signal;
      generating a reward by applying a reward function to the initial state of the traffic environment and the updated state of the traffic environment; and
   adjusting the policy based on the reward; and
   repeating one or more times the step of processing, wherein the training data sample is updated for the updated state of the traffic environment.

2. The method of claim 1, wherein:
   the traffic environment is a simulated traffic environment; and
   the traffic signal is a simulated traffic signal.

3. The method of claim 1, wherein the one or more phase durations comprises phase durations for each phase of at least one cycle of the traffic signal.

4. The method of claim 1, wherein the one or more phase durations consists of a phase duration for one phase of a cycle of the traffic signal.

5. The method of claim 1, wherein:
   the reinforcement learning model is an actor-critic model;
   the policy is an actor policy; and
   the reward function is a critic reward function.

6. The method of claim 5, wherein the actor-critic model is a proximal policy optimization (PPO) model.

7. The method of claim 1, wherein each training data sample comprises traffic data, including location data and velocity data for each of a plurality of vehicles in the traffic environment.

8. The method of claim 1, wherein each training data sample comprises traffic data, including traffic density data and traffic velocity data for each of a plurality of regions of the traffic environment.

9. The method of claim 1, wherein:
   determining an updated state of the traffic environment comprises determining a length of each of one or more queues of stationary vehicles in the traffic environment, the length indicating a number of stationary cars in the queue; and
   the one or more past training data samples comprises:
      one or more past training data samples corresponding to one or more queue peak times, each queue peak time being a time at which the length of one of the queues was at a local maximum; and
      one or more past training data samples corresponding to one or more one or more past training data samples corresponding to one or more queue trough times, each queue trough time being a time at which a length of one of the queues was at a local minimum.

10. The method of claim 1, wherein the one or more past training data samples correspond to one or more phase transition times, each phase transition time being a time at which the traffic signal transitions between two phases of the traffic signal cycle.

11. The method of claim 1, wherein the reward function is applied to the initial state of the traffic environment and the updated state of the traffic environment to calculate the reward based on an estimated number of stationary vehicles in the traffic environment over a previous traffic signal cycle.

12. The method of claim 11, wherein the one or more past training data samples correspond to one or more phase transition times, each phase transition time being a time at which the traffic signal transitions between two phases of the traffic signal cycle.

13. The method of claim 1, wherein each training data sample comprises traffic signal phase data indicating:
   the current phase of the traffic signal cycle; and
   an elapsed time during the current phase.

14. The method of claim 1, wherein:

the one or more phase durations comprises phase durations for each phase of at least one cycle of the traffic signal;

the reinforcement learning model is a proximal policy optimization (PPO) actor-critic model;

the policy is an actor policy;

the reward function is a critic reward function;

each training data sample comprises:
- traffic signal phase data indicating:
  - the current phase of the traffic signal cycle; and
  - an elapsed time during the current phase; and
- traffic data, including traffic density data and traffic velocity data for each of a plurality of regions of the traffic environment;

the reward function is applied to the initial state of the traffic environment and the updated state of the traffic environment to calculate the reward based on an estimated number of stationary vehicles in the traffic environment over a previous traffic signal cycle; and the one or more past training data samples correspond to one or more phase transition times, each phase transition time being a time at which the traffic signal transitions between two phases of the traffic signal cycle.

15. A system for training a reinforcement learning model to generate traffic signal cycle data, comprising:

a processor device; and a memory storing:
- the reinforcement learning model; and
- machine-executable instructions thereon which, when executed by the processing device, cause the system to:
  - process a training data sample indicating an initial state of a traffic environment affected by a traffic signal by:
    - using the reinforcement learning model to generate the traffic signal cycle data by applying a policy to the training data sample and one or more past training data samples, the traffic signal cycle data comprising one or more phase durations of one or more respective phases of a traffic signal cycle, each phase duration being a value selected from a continuous range of values;
    - determining an updated state of the traffic environment following application of the generated traffic signal cycle data to the traffic signal;
    - generating a reward by applying a reward function to the initial state of the traffic environment and the updated state of the traffic environment; and
    - adjusting the policy based on the reward; and
  - repeat one or more times the step of processing, wherein the training data sample is updated for the updated state of the traffic environment.

16. The system of claim 15, wherein:

the reinforcement learning model is a proximal policy optimization (PPO) actor-critic model;

the policy is an actor policy; and the reward function is a critic reward function.

17. The system of claim 15, wherein:

the reward function is applied to the initial state of the traffic environment and the updated state of the traffic environment to calculate the reward based on an estimated number of stationary vehicles in the traffic environment over a previous traffic signal cycle; and the one or more past training data samples correspond to one or more phase transition times, each phase transition time being a time at which the traffic signal transitions between two phases of the traffic signal cycle.

18. A system for generating traffic signal cycle data, comprising:

a processor device; and a memory storing:
- a trained reinforcement learning model trained in accordance with the method of claim 1; and
- machine-executable instructions which, when executed by the processing device, cause the system to:
  - receive, from a traffic monitoring system, traffic environment state data indicating a state of a real traffic environment, wherein the traffic environment used to train the reinforcement learning model is the real traffic environment or a simulated version thereof;
  - use the reinforcement learning model to generate traffic signal cycle data by applying the policy to at least the traffic environment state data; and
  - send, to a traffic control system, the traffic signal cycle data.

19. A non-transitory processor-readable medium having stored thereon a trained reinforcement learning model trained in accordance with the method of claim 1.

20. A non-transitory processor-readable medium having machine-executable instructions stored thereon which, when executed by a processor device, cause the processor device to perform the method of claim 1.

* * * * *